US007291306B2

(12) United States Patent
Ishler

(10) Patent No.: US 7,291,306 B2
(45) Date of Patent: Nov. 6, 2007

(54) APPARATUS AND METHOD FOR UTILIZING A FLEXIBLE PLUNGER

(75) Inventor: Vincent Ishler, Mercersburg, PA (US)

(73) Assignee: Rampf Molds Industries Inc., Hagerstown, MD (US)

( * ) Notice: Subject to any disclaimer, the term of this patent is extended or adjusted under 35 U.S.C. 154(b) by 198 days.

(21) Appl. No.: 11/193,367

(22) Filed: Aug. 1, 2005

(65) Prior Publication Data

US 2006/0022112 A1 Feb. 2, 2006

Related U.S. Application Data

(60) Provisional application No. 60/592,126, filed on Jul. 30, 2004.

(51) Int. Cl.
*B29C 39/36* (2006.01)

(52) U.S. Cl. ........................ 264/334; 425/419; 425/444

(58) Field of Classification Search .................. 29/428, 29/527.1, 557; 425/193, 344, 346, 355, 412, 425/416, 419, 422, 444; 264/334, 336
See application file for complete search history.

(56) References Cited

U.S. PATENT DOCUMENTS

| | | | |
|---|---|---|---|
| 805,914 | A | 11/1905 | Horr |
| 813,592 | A | 2/1906 | Schou |
| 3,940,229 | A | 2/1976 | Hutton |
| 4,407,766 | A | 10/1983 | Haardt et al. |
| 4,545,754 | A | 10/1985 | Scheidt et al. |
| 5,078,940 | A | 1/1992 | Sayles |
| 5,217,630 | A | 6/1993 | Sayles |
| 5,533,885 | A | 7/1996 | Schlusselbauer |
| 5,879,603 | A | 3/1999 | Sievert |
| 6,113,379 | A | 9/2000 | LaCroix et al. |
| 6,138,983 | A | 10/2000 | Sievert |
| 6,209,848 | B1 | 4/2001 | Bolles et al. |
| 6,224,815 | B1 | 5/2001 | LaCroix et al. |
| 6,280,566 | B1 | 8/2001 | Naito et al. |
| 6,464,199 | B1 | 10/2002 | Johnson |
| 2003/0164574 | A1 | 9/2003 | Hammer et al. |
| 2005/0116389 | A1 | 6/2005 | Hammer et al. |

FOREIGN PATENT DOCUMENTS

| | | |
|---|---|---|
| JP | 2001191314 A | 7/2001 |

*Primary Examiner*—Yogendra N. Gupta
*Assistant Examiner*—Emmanuel S Luk
(74) *Attorney, Agent, or Firm*—Howrey LLP

(57) ABSTRACT

One embodiment of the present invention includes an assembly for stripping a medium from a mold cavity. The assembly may include at least one stripper shoe, a head structure, and a flexible plunger connecting the head structure and the at least one stripper shoe. The flexible plunger may include cutouts or openings along the length of the plunger to induce increased flexibility. The flexible plunger may include a first bending stiffness at one end of the plunger and a second bending stiffness the opposite end of the plunger. The cutouts may be configured such that the second bending stiffness is substantially less than the first bending stiffness. By increasing the flexibility of the plungers, the usable life of the assembly may be prolonged while maintaining product quality.

20 Claims, 32 Drawing Sheets

Channel A

Channel B

Channel C

APPARATUS AND METHOD FOR UTILIZING A FLEXIBLE PLUNGER

This application claims priority from U.S. provisional patent application Ser. No. 60/592,126, filed Jul. 30, 2004, entitled "APPARATUS AND METHOD FOR UTILIZING A FLEXIBLE PLUNGER," the disclosure of which incorporate herein, in its entirety, by reference.

FIELD OF THE INVENTION

The invention generally relates to concrete-based product making machinery, and more particularly to an apparatus and method for extending the useable life of the concrete-based product making machinery.

BACKGROUND OF THE INVENTION

The production of concrete masonry units is accomplished using a concrete mold assembly and a tamperhead which strips formed and compacted concrete or other medium from a mold cavity. The tamperhead is composed of several sub-components which include an upper head structure, a plunger and a stripper shoe. Multiple sets of stripper shoes and plungers may be connected to a single head structure and used to strip multiple masonry units from the mold assembly or set of concrete mold cavities. The plungers are commonly fabricated in structural shapes from a rigid material such as steel and provide the structural load path to compress the concrete and strip the formed concrete product from the mold.

The production or forming process induces significant wear and stress on the plunger. Upon filling the mold with concrete, the tamperhead is lowered until the stripper shoe contacts the concrete. The stripper shoes are guided and forced into alignment with the mold cavities by leading angles or chamfers on the top edge mold cavities. As the stripper shoes are lowered, the impact of the stripper shoes with the leading angles imparts high stresses on the plunger, especially the joint attaching the plunger to the head structure.

The forming process also includes vibrating or shaking the mold assembly with a vibration system in order to further compact the concrete. The vibration system spreads the concrete material evenly within the mold assembly cavities to produce a more homogeneous concrete product and assist in compacting the concrete product. Vibrations from the mold assembly transfer to the stripper shoes and consequently to the plunger and head structure and occur approximately every ten to fifteen seconds during typical production Unfortunately, the repeated forces transmitted by the vibrations from the mold to the stripper shoe makes the plunger and joints susceptible to fatigue failure. Furthermore, the high impact stresses from the alignment of the stripper shoe with the mold cavity further stress the plunger and joints. As a result of the combined stresses, expensive plungers typically last only short periods and must be replaced at great expense and a loss of production time.

Furthermore, as the vibrator system shakes the mold assembly, the rest of the product-forming machine also experiences vibrations as forces are transmitted through the plunger. This vibration fatigues the machine parts and alters the clearances between moving parts, such as hydraulics and gears. Mold assemblies and stripper shoes also suffer from repeated impact stresses and wear during vibration and alignment. As molding components degrade, surface quality and product density of the finished product degrades. Thus, transmitted vibrations and alignment impacts reduce machine and mold assembly operating life, resulting in reduced product quality and increased replacement of parts.

The prior art teaches a traditional approach of avoiding frequent failures and replacements of plungers by consistently shortening the plunger length and increasing the plunger strength and/or stiffness. However, this approach has not been successful at extending the useful life of a plunger. Time has shown that short stiff plungers still frequently fail, with the joint between the plunger and the head structure being especially vulnerable. In fact, stiffer plungers increase wear on stripper shoes and mold assemblies and therefore exacerbate the need to replace or repair expensive components.

Traditional plungers with reduced flexibility also increase production costs. As the flexibility of traditional plungers decreases, the weight and/or expense of fabricating plungers increases as a result of increased thickness or design. Increased weight functions to increase the required power and expense of running the production machinery and to decrease the resonant frequency of the plunger and stripper shoe. The increased weight also intensifies the deterioration of moving parts under heavy load and increases impact forces between stripper shoes and molding assemblies. Although lighter plungers may be constructed from materials with high strength to weight ratios, the additional cost of materials and fabrication has been prohibitive.

Therefore, there exists a need for a tamperhead and mold assembly which is less susceptible to failure from vibration, reduces fatigue stresses in the connection between the head structure and plunger, and reduces impact loads between mold cavities and stripper shoes during alignment of stripper shoes and mold cavities and during vibration.

There is also a need to improve surface quality and product density of the finished product by extending the useable life of the molding components and machinery.

SUMMARY OF THE INVENTION

One embodiment of the present invention includes an assembly for stripping a medium from a mold cavity. The assembly may include at least one stripper shoe, a head structure, and at least one flexible plunger connecting the head structure and the at least one stripper shoe. The flexible plunger may include a first end and a second end and a longitudinal axis therebetween. The flexible plunger may also include a first direction substantially orthogonal to the longitudinal axis and a second direction substantially orthogonal to the longitudinal axis and the first direction. Further, the flexible plunger may include a first bending stiffness about the first direction and at the first end and a second bending stiffness about the first direction and at a position between the first end and the second end. The second bending stiffness may be substantially less than the first bending stiffness.

In another embodiment of the present invention, an assembly for stripping concrete from a mold may include at least one stripper shoe receivable in the mold, a head structure, and at least one flexible plunger connecting the head structure to the at least one stripper shoe. The flexible plunger may be configured from a hollow tube having a first end and a second end and a longitudinal axis therebetween. The hollow tube may also include at least one opening at least partially between the first end and the second end, a first direction substantially orthogonal to the longitudinal axis and a second direction substantially orthogonal to the longitudinal axis and the first direction. The hollow tube may further include a first bending stiffness of the hollow tube about the first direction and at the first end and a second bending stiffness of the hollow tube about the first direction and at the at least one opening. The second bending stiffness may be substantially less than the first bending stiffness.

In a third embodiment of the present invention, a method of increasing flexibility in an assembly for forming masonry units may include forming at least one plunger using a tubular structure having a first end and a second end and a longitudinal axis therebetween. The tubular structure may have a wall, a first direction substantially orthogonal to the longitudinal axis and a first bending stiffness about the first direction and at the first end of the tubular structure. The method may also include forming at least one opening in the wall of the tubular structure at least partially between the first end and the second end such that the at least one opening is responsible for a second bending stiffness about the first direction and at the at least one opening. The second bending stiffness may be substantially less than the first bending stiffness. Finally, the method may include connecting the at least one plunger to a head structure and connecting the at least one plunger to a stripper shoe.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

Figure 1A:
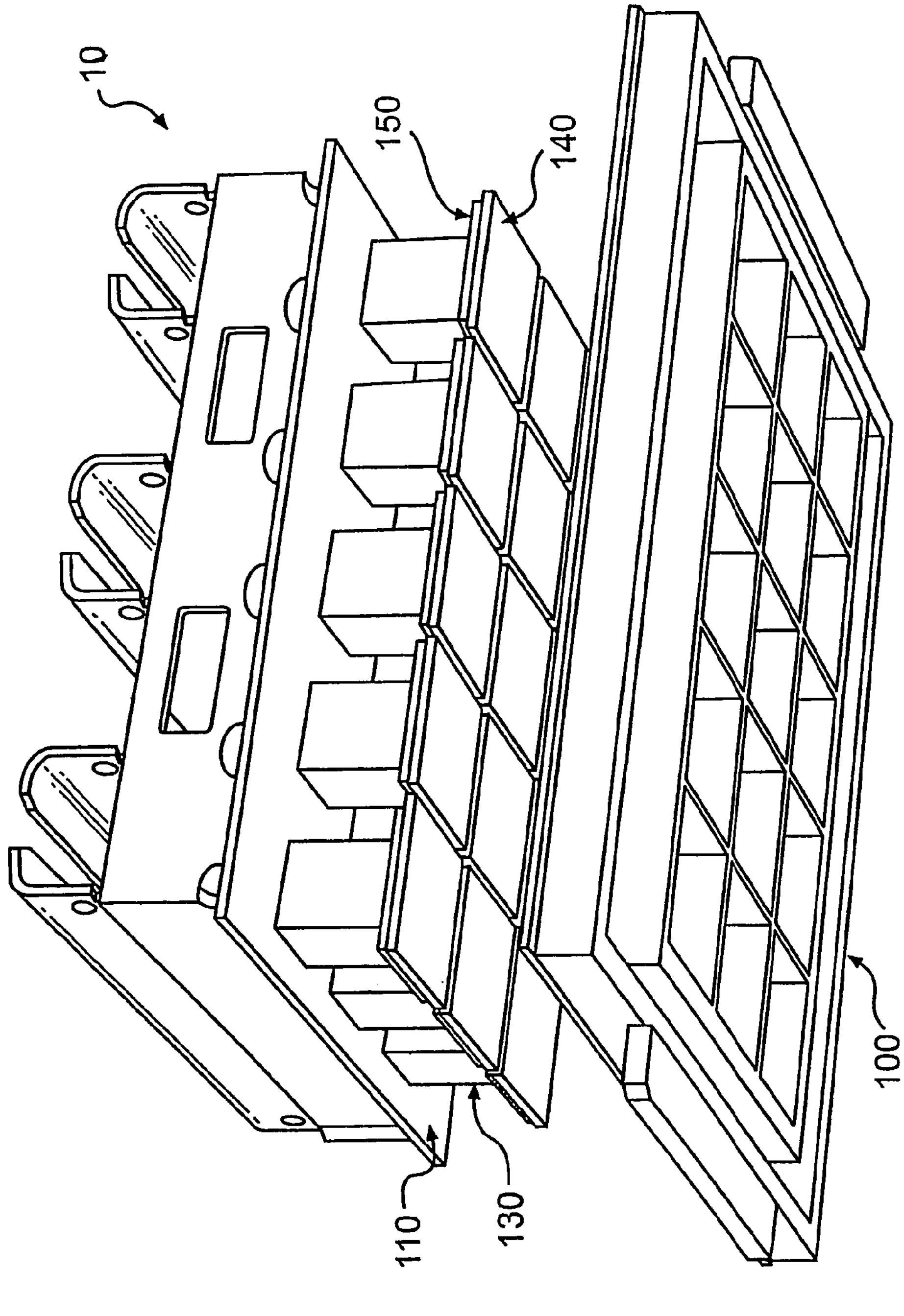
FIG. 1A (Prior Art)
FIGS. 1A-F illustrate portions of a prior art concrete mold production assembly.
Figure 1B:
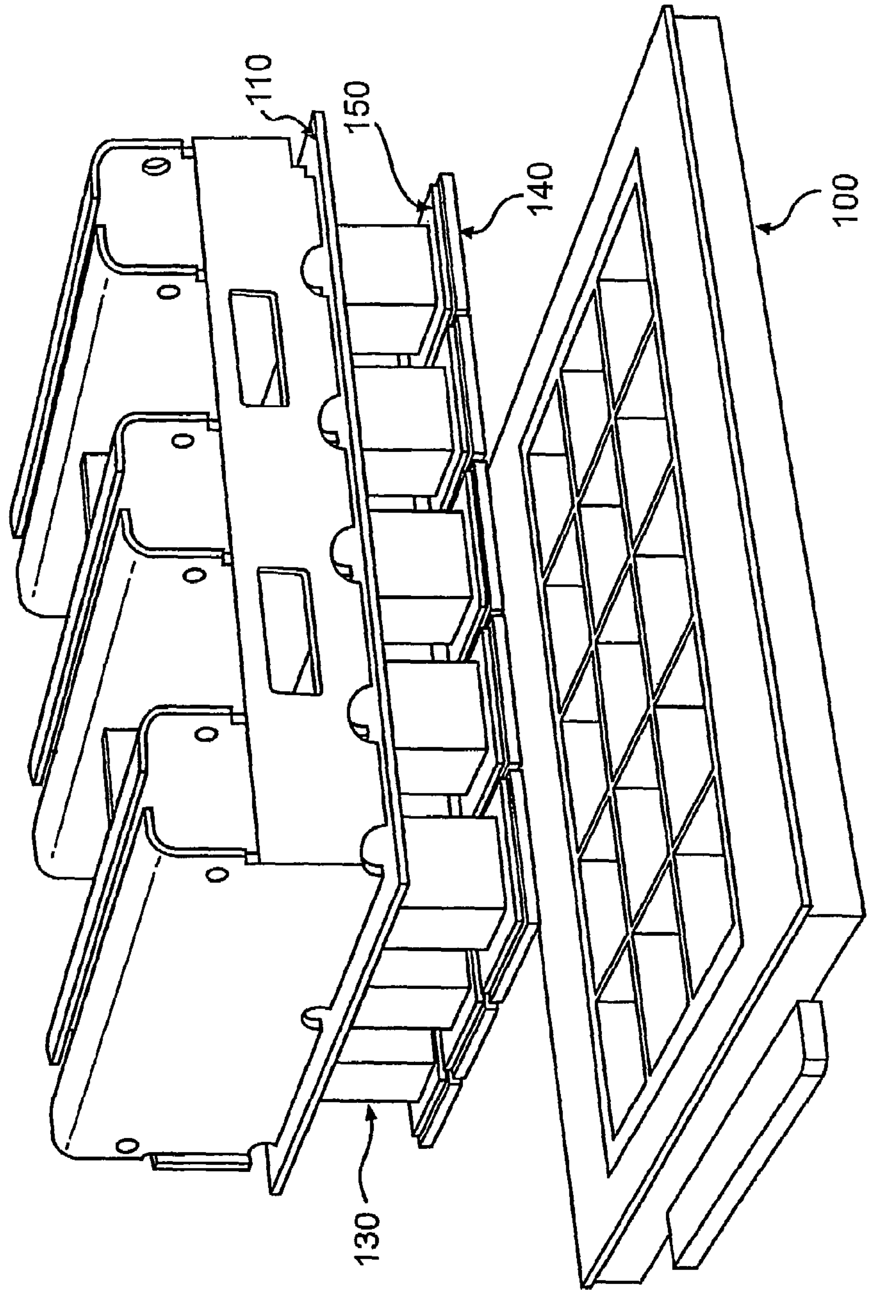
FIG. 1B (Prior Art)

For simplicity and illustrative purposes, the principles of the present invention are described by referring mainly to exemplary embodiments thereof. However, one of ordinary skill in the art would readily recognize that the same principles are equally applicable to, and can be implemented in, many types of machines that produce products by molds, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In FIGS. 1A-F, a prior art embodiment of a molding machine 10 for forming concrete products is shown. The molding machine 10 includes a tamperhead section having a head structure 110, a plunger 130, a backing plate 150, and a stripper shoe 140. The plunger 130 connects to the head structure 110 and the backing plate 150 of the stripper shoe 140 by welding. The molding machine 10 also includes a mold assembly having a stationary frame and insert 100. The frame and insert 100 receives individual molding cavities 120 which receive concrete material from a feed drawer (not shown).

The head structure 110 is mounted on a compression beam (not shown). The head structure 110 rises above the mold assembly when the compression beam moves vertically upward to a raised position. A pallet (not shown) is positioned against a bottom side of the mold assembly. The pallet seals the bottom side of cavities 122 in the mold cavities 120. A feed drawer moves concrete material over the top of the mold cavities 120 and dispenses the material into the contoured cavities. The frame and insert 100 may be shaken as material is dispensed to assist in compacting the concrete and improving surface quality. After material is dispersed, the feed drawer is withdrawn and the compression beam and the head structure 110 are lowered such that the stripper shoes 140 enter the mold cavities 120.

The mold cavities 120 typically hold the concrete or other medium for only about five to eight seconds during which the concrete is partially set. During each cycle, the frame and insert 100 may be shaken and the stripper shoe may be forced downward to compact the material. As a result, the mold assembly is shaken at least about every ten to fifteen seconds. Finally, the stripper shoes 140 are pushed further through the mold cavities 120, or the mold cavities 120 are lifted vertically, such that the formed concrete may be removed from the bottom of the mold cavities 120 and removed with the pallet.

Figure 1C:
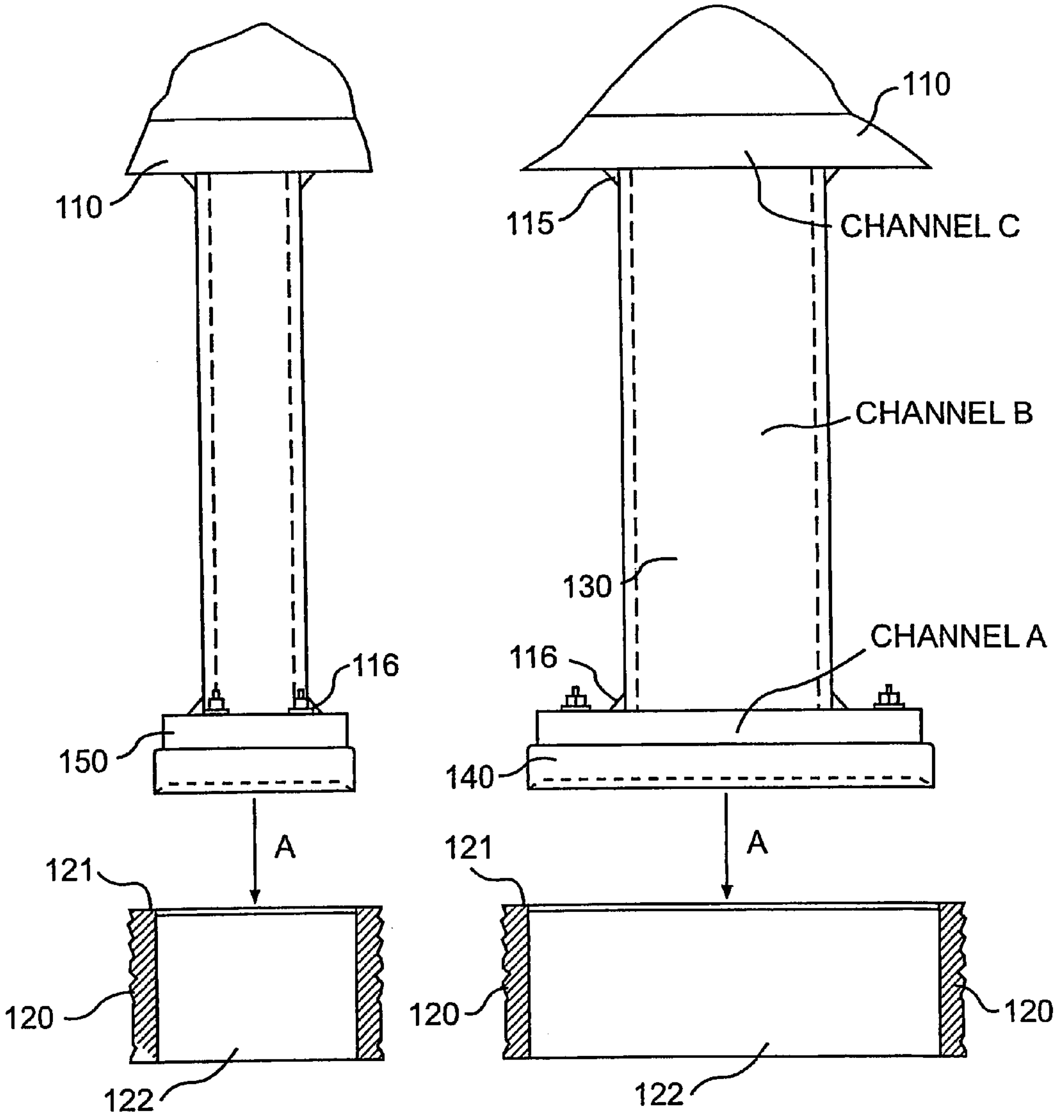
FIG. 1C (Prior Art)

In FIG. 1C, the prior art plunger 130 and stripper shoe 140 are shown in relation to a single mold cavity 120. The plunger 130 may be configured to increase rigidity and decrease flexibility by reducing the length of the plunger 130 and/or increasing the thickness and/or shape of the plunger wall thickness. In order to function properly, however, the length of the prior art plunger 130 may be sufficient to extend through and expel the formed concrete from the mold cavity 120.

As shown in FIG. 1C, the mold cavity 120 includes a leading angle 121 on the top edge of the mold cavity 120 as the guiding mechanism for the aligning the stripper shoe 140 within the mold cavity 120. As the stripper shoe 140 is lowered in the direction of the arrow in FIG. 1C, the leading angle 121 forces the stripper shoe 140 into alignment with the cavity 122 of the mold cavity 120. Contact between the stripper shoe 140 and the leading angle 121 during lowering of the head structure 110 generates severe stresses on the plunger 130 and the joints connecting the stripper shoe 140 and the head structure 110.

Joint 115, connecting plunger 130 and head structure 110, in particular experiences high stresses when the stripper shoe 140 is forced within the cavity 122, especially when the stripper shoe 140 initially impacts the leading angle 121 during alignment. The impact between the stripper shoe 140 and the leading angle 121 also results in increase wear and deterioration of the stripper shoes 140 and the mold cavities 120.

Figure 1D:
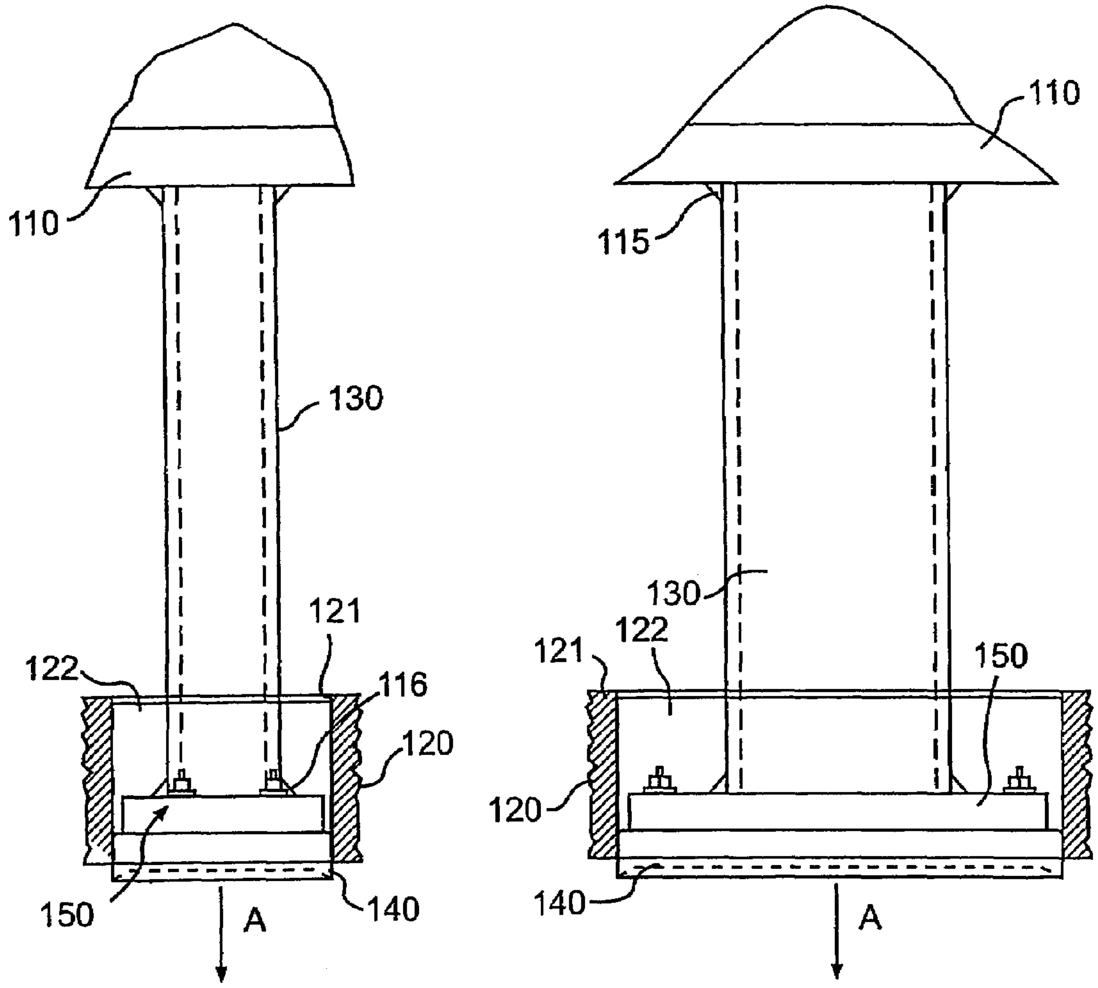
FIG. 1D (Prior Art)
Figure 1E:
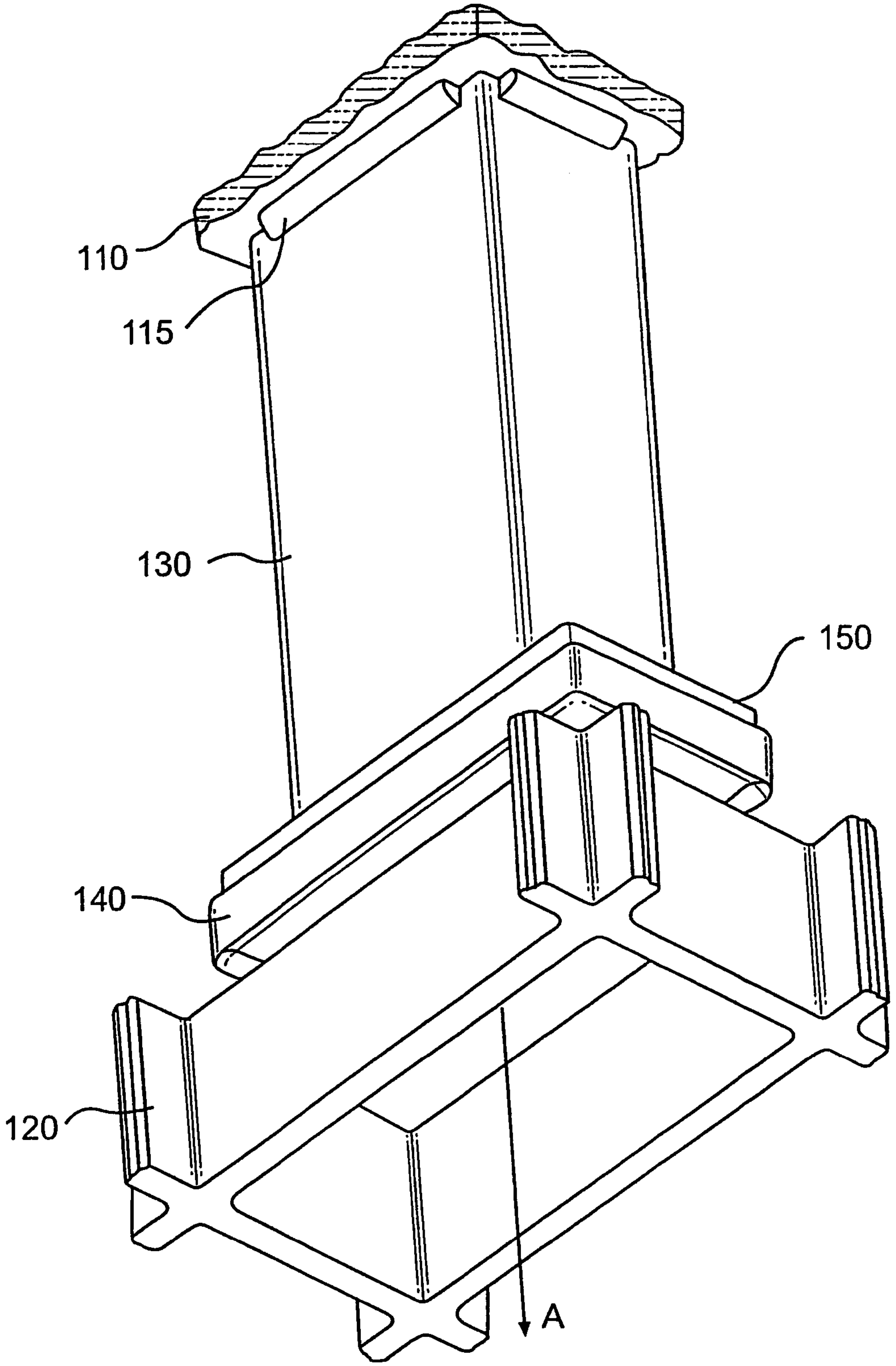
FIG. 1E (Prior Art)
Figure 1F:
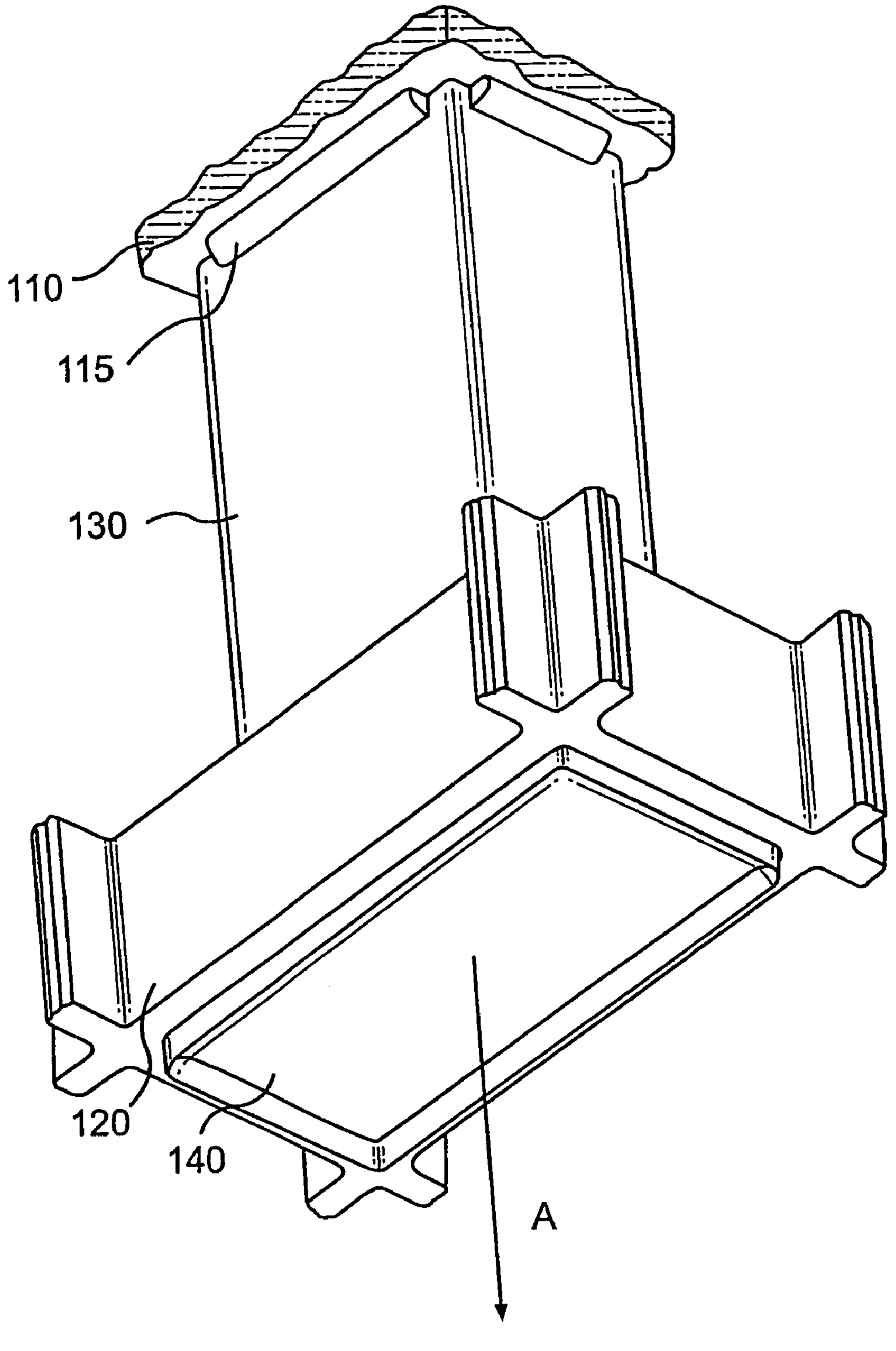
FIG. 1F (Prior Art)

In FIG. 1D, stripper shoe 140 is shown aligned with and received in the mold cavity 120. The clearance between the stripper shoe 140 and mold cavity 120 is minimal. The minimal clearance is required so that the stripper shoe 140 can strip concrete from the walls of the mold cavity 120 as the stripper shoe 140 is pushed through the mold cavity 120. Unfortunately, this minimal clearance assists in the transmission of vibrations and forces from the mold cavity 120 to the stripper shoe 140. Depending on the type and size of product being manufactured, this clearance may range from about 0.2 mm to about 1.5 mm per side. If the clearance is too small, the shoe will rub against the cavity wall inducing stress in the mold and production machinery as well as premature wear. If the clearance is too big, concrete may protrude between shoe and cavity walls, forming “burrs” on top of the product which, at best, detracts from its aesthetic appeal and, at worst, creates installation problems in the field.

Figure 1G:
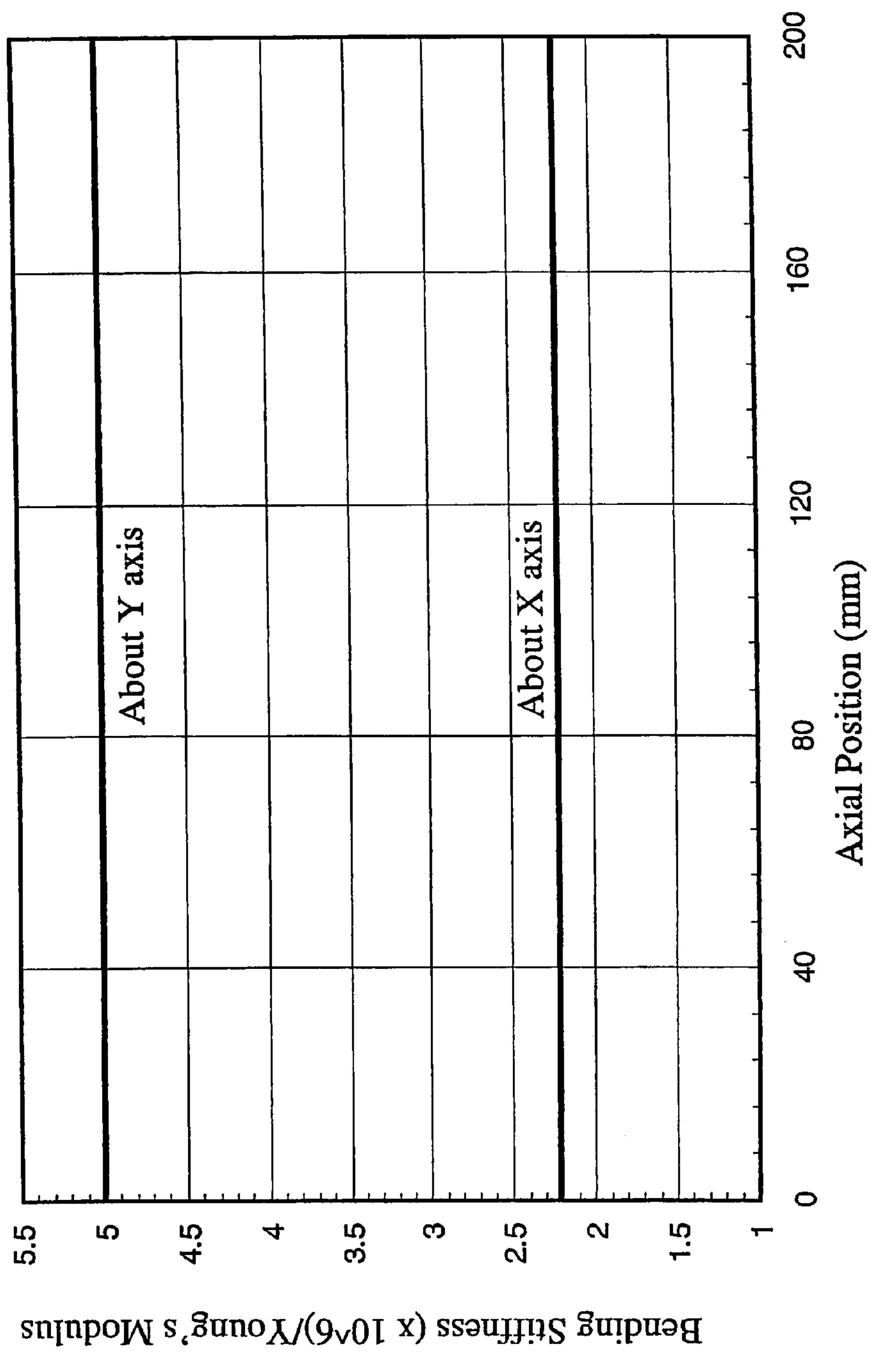
FIG. 1G (Prior Art)
FIG. 1G illustrates a graph of bending stiffness associated with a prior art plunger.

FIG. 1G shows a graph of the axial variation of the bending stiffness of the traditional plunger 130 as shown in FIGS. 1A-F. As shown in the graph, the bending stiffness/young’s modulus is plotted along the Y axis of the graph and the axial position on the plunger is plotted along the X axis of the graph. A traditional plunger 130 includes a constant bending stiffness along each axis for the entire length of the plunger because the cross section or moment of inertia of the plunger does not vary along the length of the plunger. According to the graph, a traditional plunger, having a width of 5 inches, a depth of 3 inches, a wall thickness of ¼ inch, and a length of 200 mm, includes a minimum bending stiffness about the X axis of $2.26\times10^{6}$/Young’s Modulus and a minimum bending stiffness about the Y axis of $5.14\times10^{6}$/Young’s Modulus.

The traditional plungers of FIGS. 1A-F are conventionally constructed from blocks of steel, alloy or other metallic material of limited flexibility. Typically, a commercially available 2"×4" steel tube, cut to the appropriate length, is used to fabricate the plunger. As discussed above, traditional plungers have been made shorter, stronger, and more rigid in an attempt to better manage plunger and weld failures due to vibration force transmissions and impact forces from the stripper shoe 140 during alignment and during vibration of the mold cavities 120.

It has been shown, however, that shorter, rigid plungers, such as plunger 130 shown in FIGS. 1A-F, fail to prolong plunger life. Test results indicate that rigid plungers transmit vibrations and impact forces directly to the plungers and the joints connecting the plungers to the stripper shoe 140 and the head structure 110. The transmission of these forces causes fatigue stresses in the plunger and joints and eventually cause crack formation and failure. Furthermore, the stripper shoes 140 and the mold cavities 120 also experience wear and must be replaced.

Figure 2:
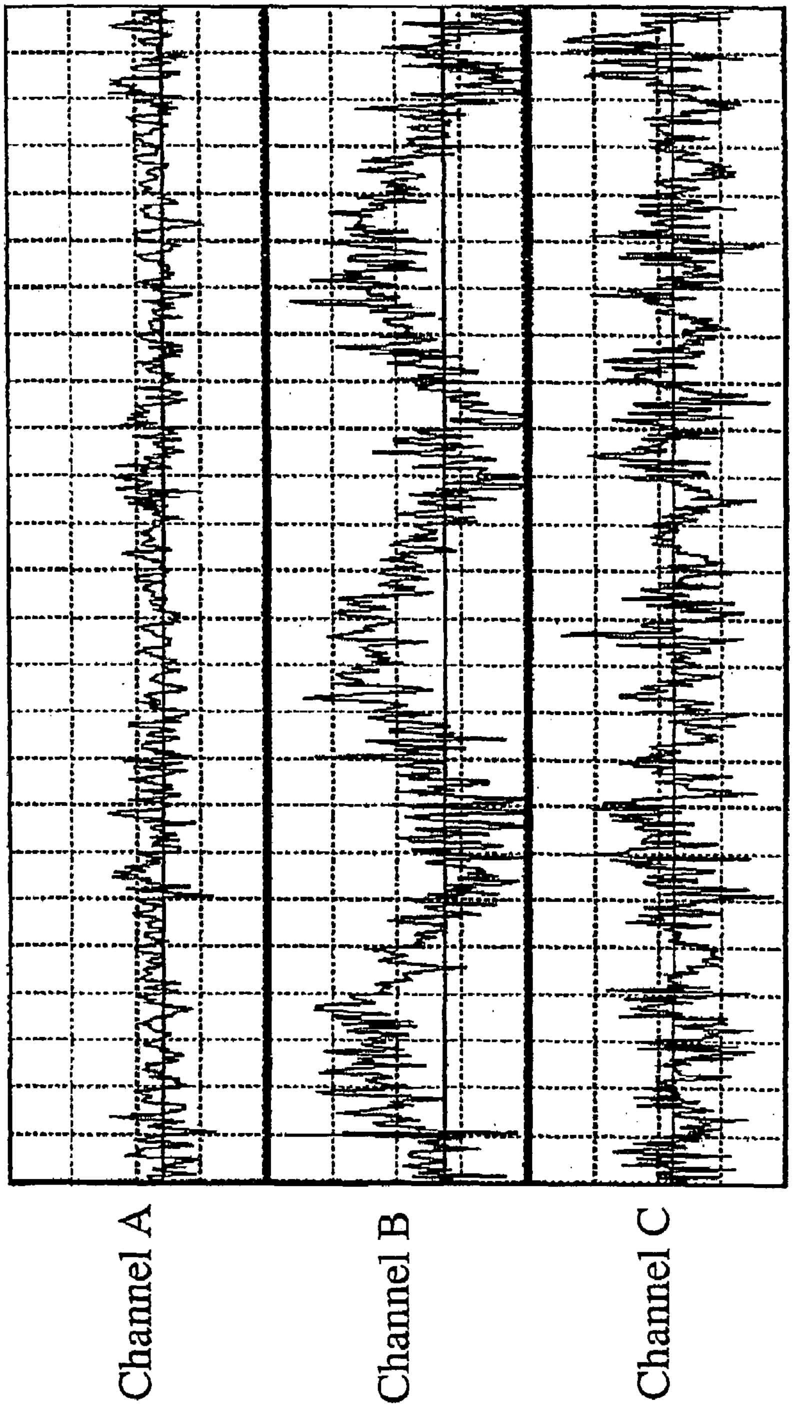
FIG. 2 (Prior Art)
FIG. 2 illustrates vibrational test data associated with a prior art plunger.

Referring now to FIG. 2, the rigidity of the plunger 130 transmits forces and vibrations from the mold cavity 120 to the head structure 110. As mentioned, these vibrations induce fatigue stresses in the plunger 130 and joints connecting the plunger 130 to stripper shoe 140 and the head structure 110. FIG. 2 illustrates the transmission of vibrations from the stripper shoe to the head structure in a simulated vibration test on a conventional plunger. Vibration sensors recorded the amount of vibration at three locations (approximately located as indicated as shown in FIG. 1C): the vibrator (channel A), the middle of the plunger (channel B), and the head structure (channel C).

In the simulation, a prior art plunger was welded to a first plate representing the head structure at one end and second plate representing the backing plate at the other end. A vibrator was bolted to the second plate and used to simulate the vibrations experienced during compaction. In the vibration testing, the vibrator induced a frequency of 50 Hz with an amplitude of 2.5 mm.

The test results of FIG. 2 show significant transmission of induced vibration on channel A through to the plunger on channel B and to the head structure on channel C. The traditional plunger used in the testing included a steel 2"×4" tube with ¼ inch wall thickness with a length of 200 mm. The traditional plunger was welded to the backup plate and the upper head structure as shown and described in reference to FIGS. 1C-F. Failure of the traditional plunger occurred after 30 minutes with a crack starting in a crater of the welding between the plunger and the upper head structure, a typical type of failure occurring in the during actual use.

Contrary to the prior art, embodiments of the present invention generally pertain to utilizing a flexible plunger in a tamperhead. According to the present invention, flexible plungers are less susceptible to vibration-induced stresses and high stresses from alignment impacts. As a result, flexible plungers may benefit from longer life cycles and better surface quality on the finished product. The flexible plungers may also benefit from reduced weight, making the production machinery less expensive to run and the plungers easier and less expensive to fabricate.

In the present invention, the rigidity of a plunger may be reduced by modifying an existing plunger to reduce the spring constant or by fabricating a plunger with a reduced spring constant. For example, one embodiment of a flexible plunger according to the present invention may be formed by annealing the metal of a plunger to reduce the young’s modulus of the metal and increase the flexibility of the plunger. Another embodiment may include modifying an existing plunger or fabricating a plunger such that material is removed from the walls of the plunger to reduce the rigidity of the plunger. The removed material may be in the shape of one or more cutouts of multiple dimensions.

Referring now to FIGS. 3A-F, an example of one embodiment of the present invention is shown. The flexible plungers 200 may include increased flexibility due to the removal of the material in the cutouts 210 and the formation of the four legs 215. The flexible plungers 200 are shown connecting the stripper shoe 140 and the head structure 110. As shown, the plungers 200 are not the solid tubular structure as taught in the prior art but have geometric cutouts removed from the plungers 200 to increase the flexibility and/or decrease the rigidity of the plungers 200.

Figure 3A:
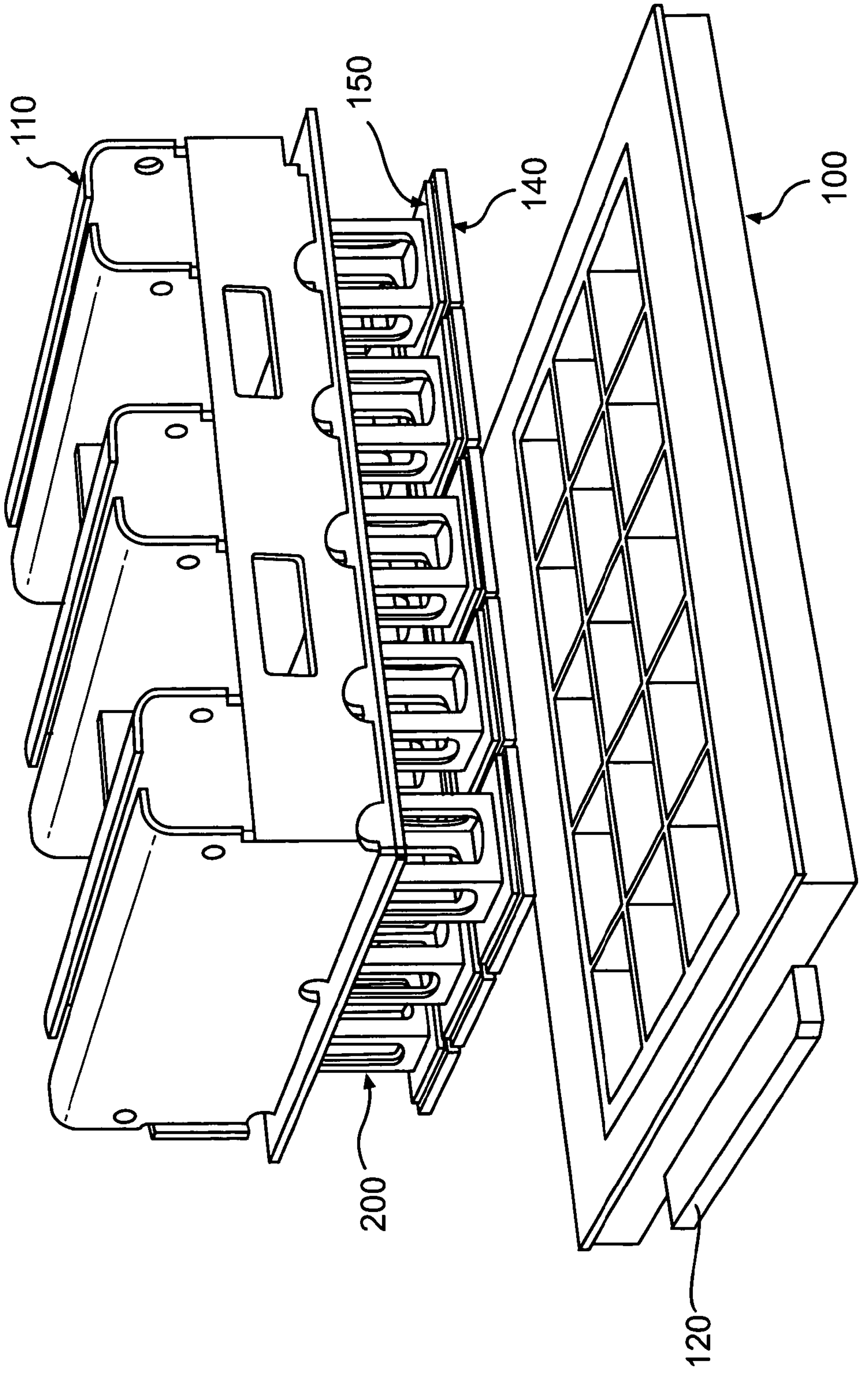
FIGS. 3A-F illustrate a flexible plunger and portions of a concrete mold production assembly in accordance with an embodiment of the present invention.
Figure 3B:
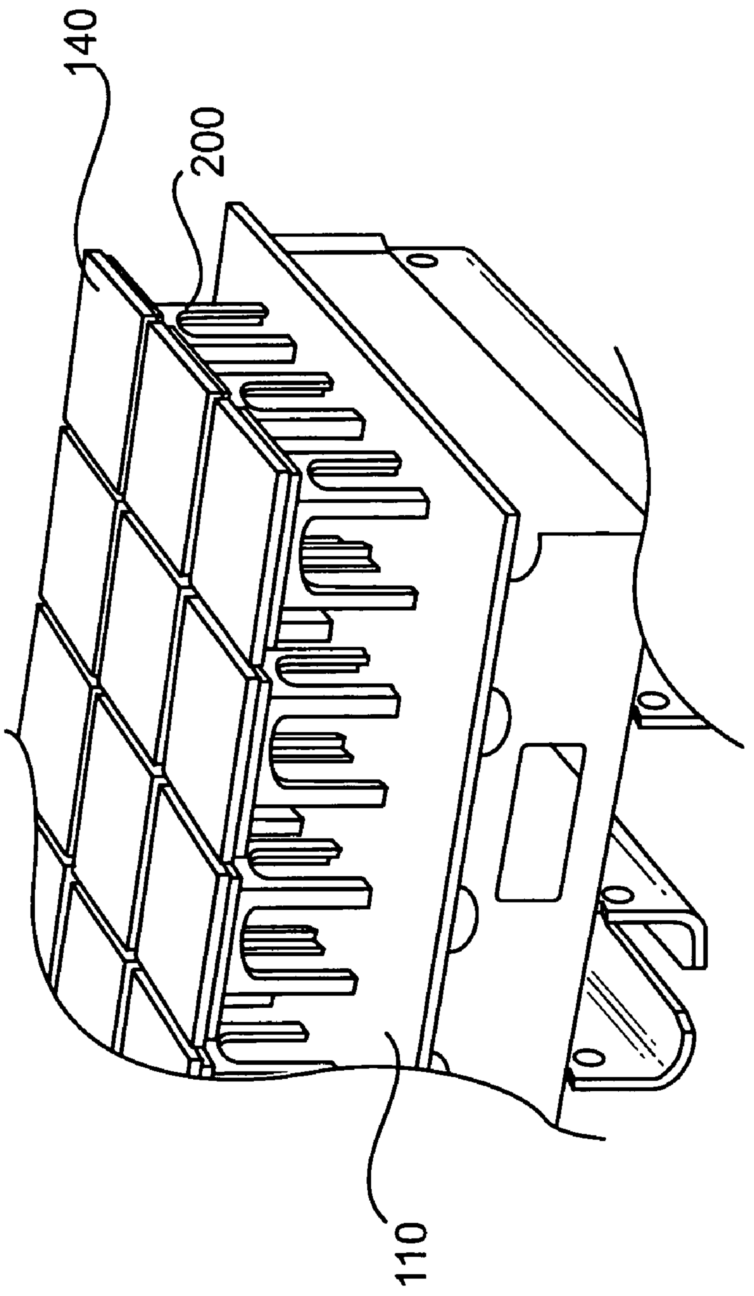
Figure 3C:
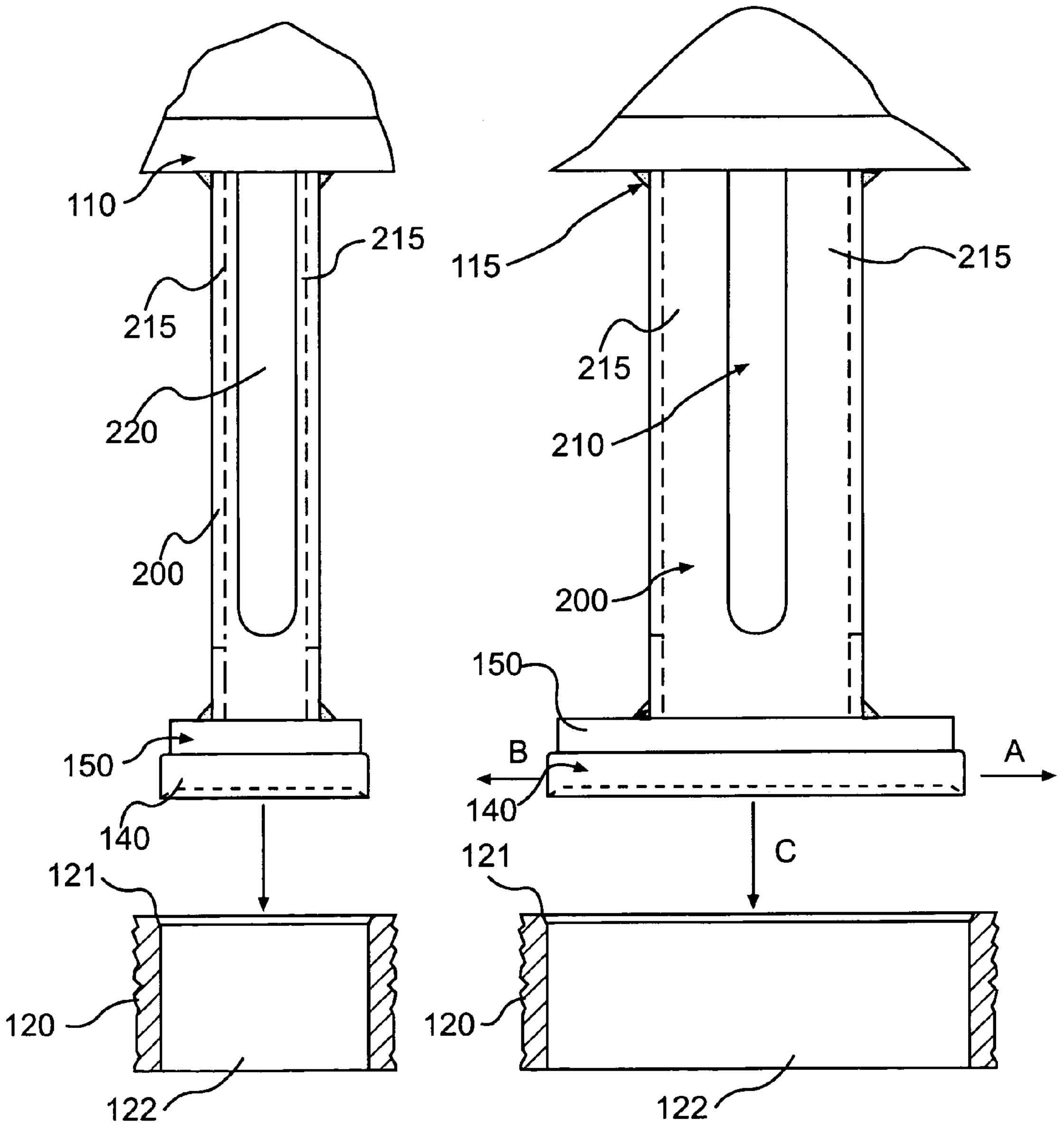
Figure 3D:
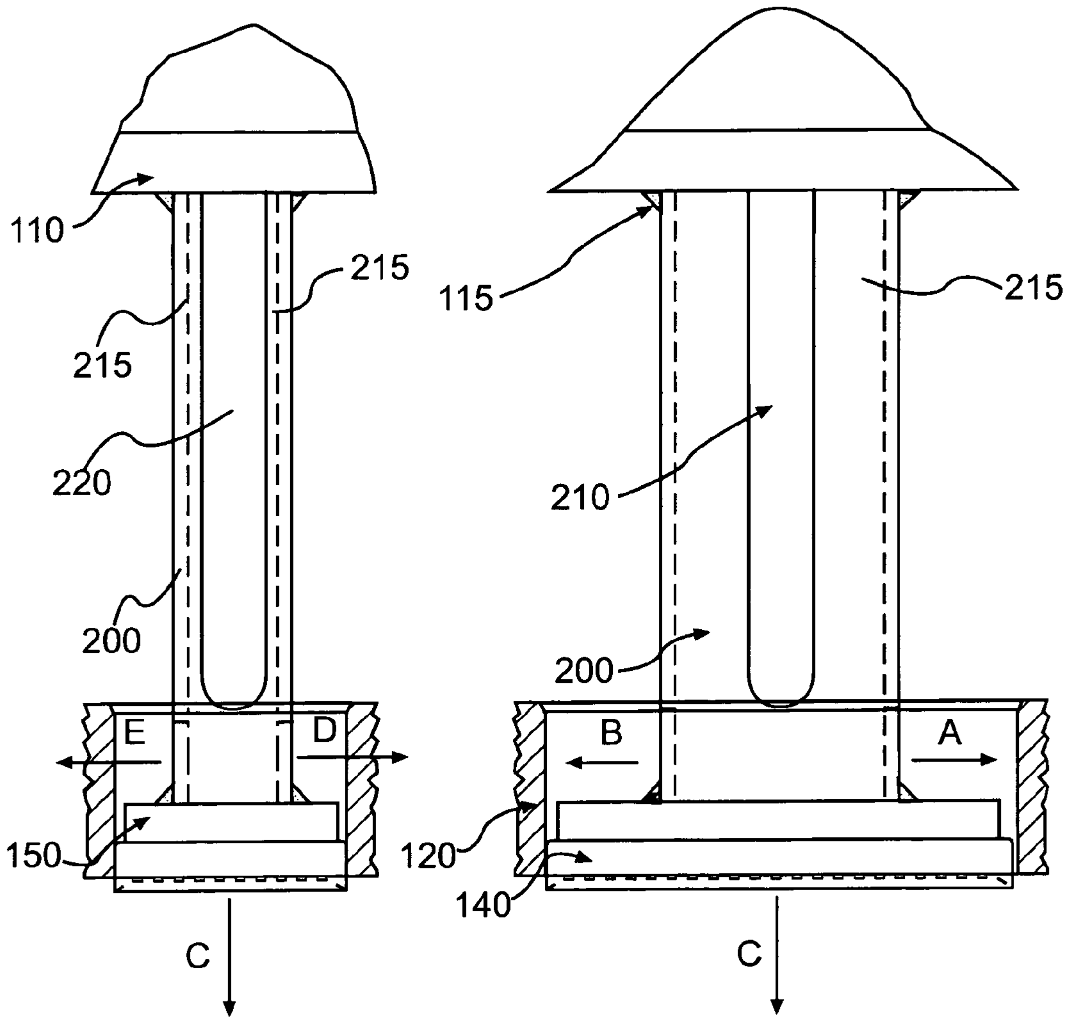
Figure 3E:
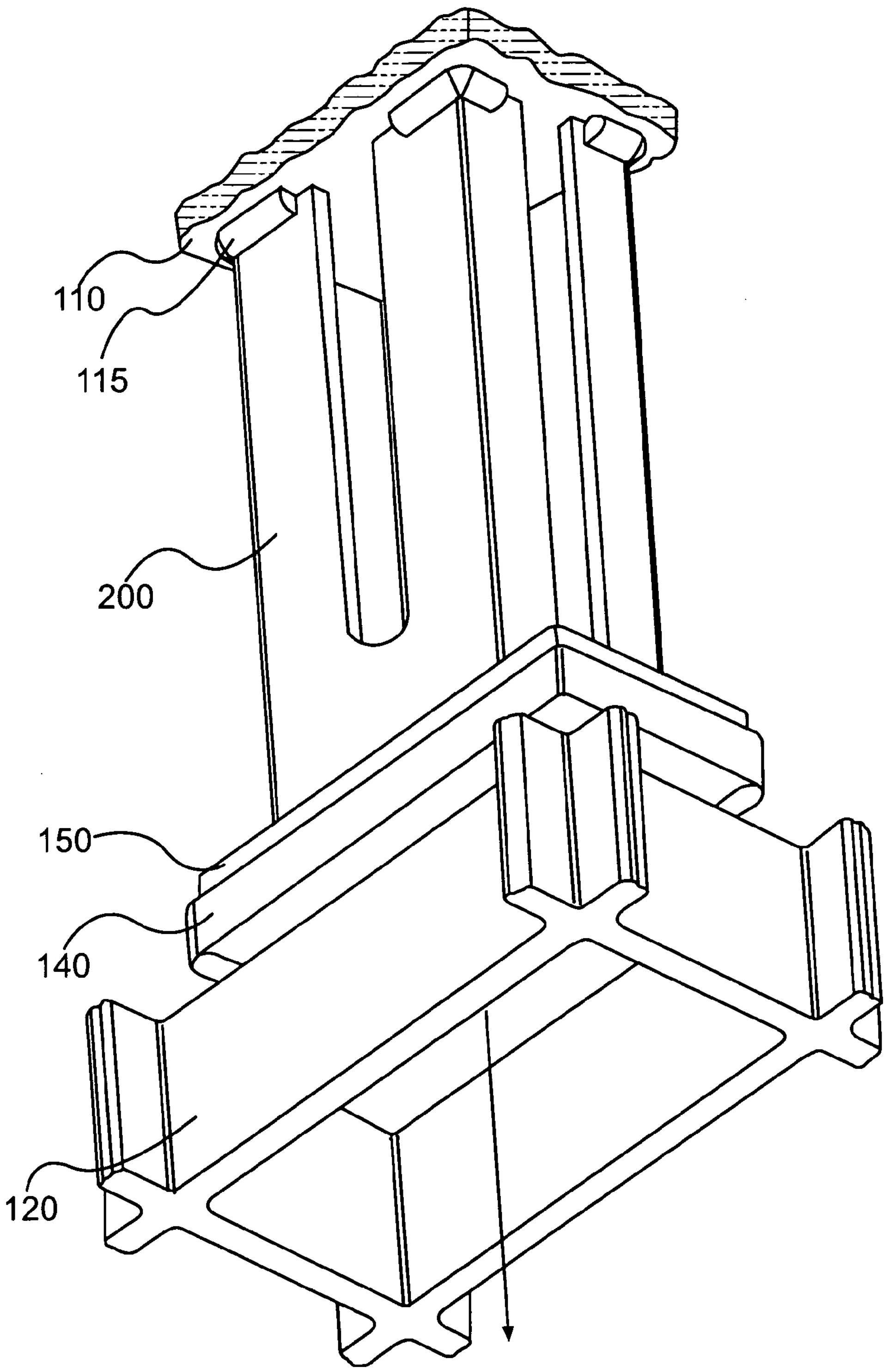
Figure 3F:
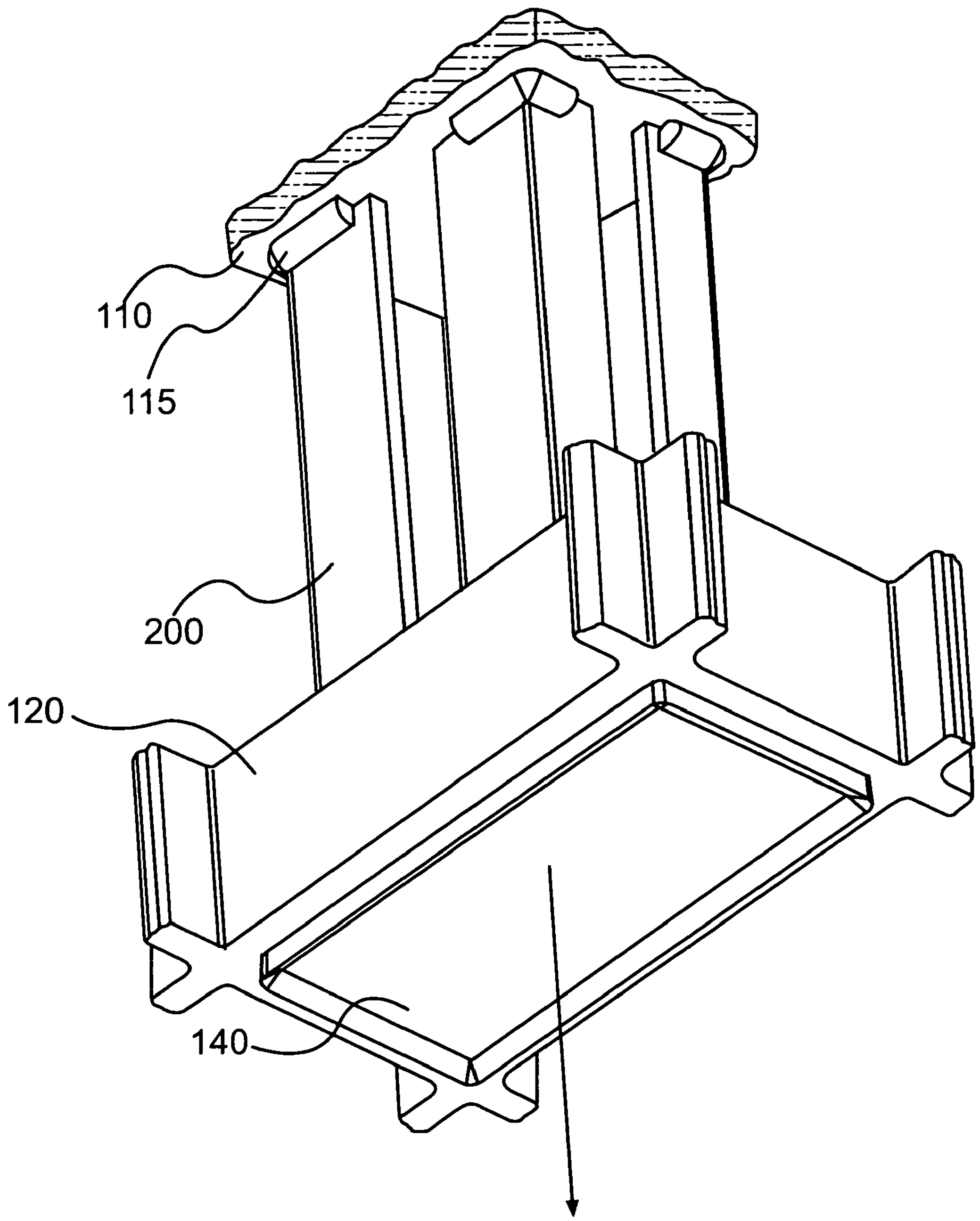

In FIGS. 3C and 3D, the flexible plungers 200 are shown with vertical cutouts 210 running the substantial length of the plungers 200. The formation of the legs 215 and the cutouts 210 provide the plunger 200 with greater flexibility in the directions indicated by arrows A and B. The flexible plunger 200 also includes induced flexibility in the direction indicated by arrows D and E. However, the legs 215 may maintain the required axial stiffness in the direction indicated by arrow C as required for compaction and stripping the concrete from the mold cavity 120.

The flexible plungers 200 may absorb and/or dampen a portion of the vibrations transmitted from the mold cavities 120 to the head structure 110 by flexing upon alignment impact and during vibrations. The flexibility of the flexible plungers 200 may also reduce fatigue stresses in the joint 115, allowing the plunger life to be prolonged. Furthermore, flexible plungers reduce the wear and stress on the stripper shoes 140 and the mold cavities 120, resulting in longer component life and improved surface quality and density of the finished concrete product.

It should be noted that rigidity in the direction indicated by arrow C may be necessary for compression of the concrete during compaction and for consistent density in the finished product. However, flexibility in the plunger in the direction of arrow C may be employed in applications where rigidity in the direction indicated by arrow C is not necessary without deviating from the scope and spirit of the present invention.

The flexibility of the plungers 200 may dampen or cushion against impacts between the stripper shoe 140 and the mold cavity 120 and eases the transmission of high stresses to the joints between the stripper shoe 140 and the head structure 110. The flexibility also dampens the transmission of vibrations from the mold cavity 120 to the stripper shoe 140 when the head structure 110 is positioned as shown in FIG. 3D. By reducing stress levels in the joints, the flexible plungers 200 may increase the usable life of mechanical fasteners and welds used to join the plunger 200 to the stripper shoe 140 and the plunger 200 to the head structure 110.

Figure 3G:
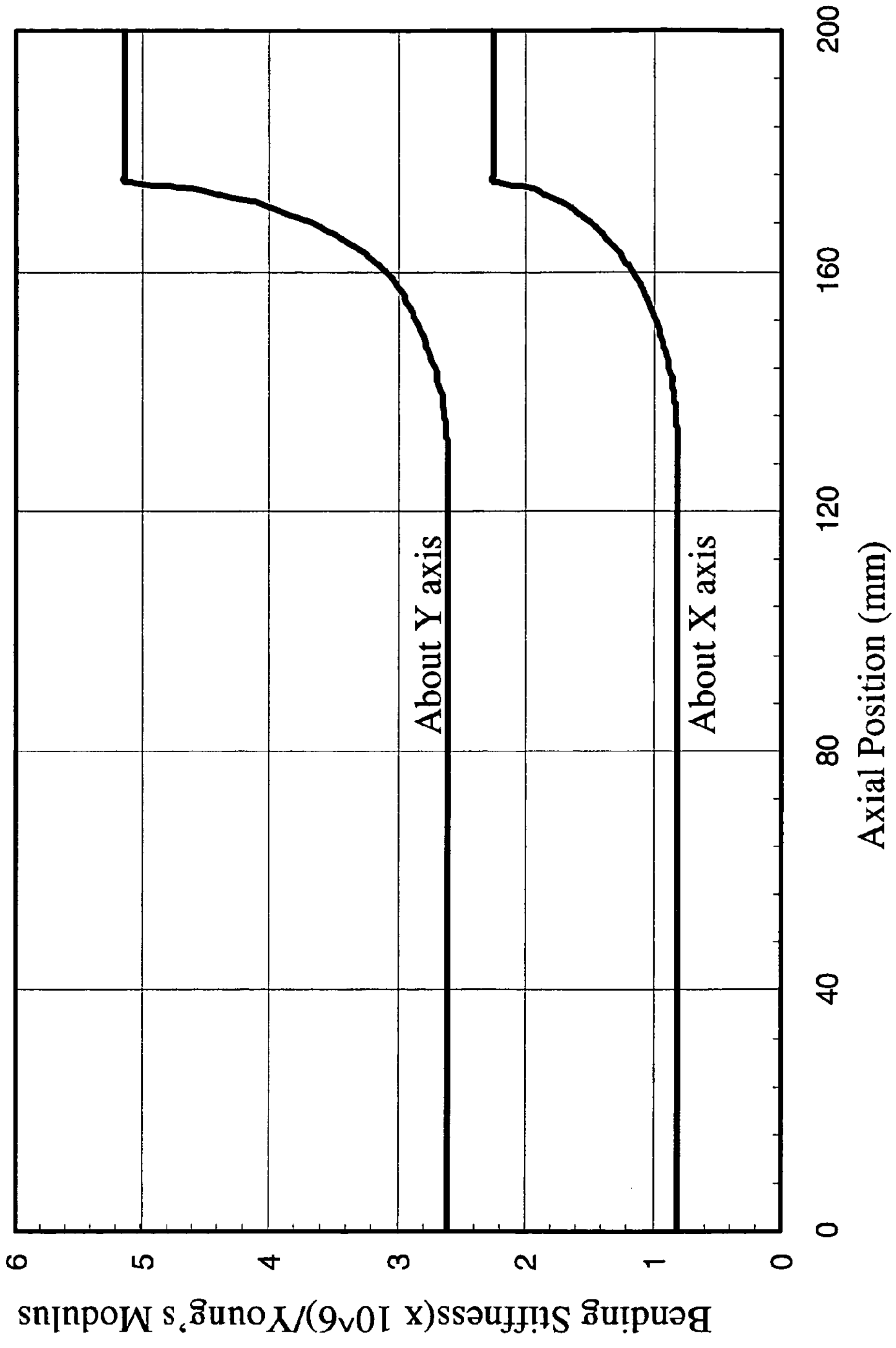
FIG. 3G illustrates a graph of bending stiffness associated with a flexible plunger in accordance with an embodiment of the present invention.

FIG. 3G shows a graph of the axial variation of the bending stiffness of one embodiment of a flexible plunger according to the present invention configured with cutouts removed from the plunger, generally as shown in FIGS. 3A-F. The flexible plunger used to generate the graph of FIG. 3G includes a hollow tube, having a length of approximately 200 mm, a width of approximately 5 inches, a dept of approximately 3 inches, a wall thickness of approximately ¼ inch, and four cutouts. The cutouts on the 5-inch faces of the tube are approximately 3.5 inches wide, approximately 175 mm long from one end, and centered on the face of the flexible plunger. The cutouts on the 3-inch faces are approximately 1.5 inches wide, approximately 175 mm long from one end, and centered on the face of the flexible plunger. As shown in the graph of FIG. 3G, the bending stiffness/young's modulus is plotted along the vertical axis of the graph and the axial position on the plunger is plotted along the horizontal axis of the graph. The bending stiffness about the X and Y axes drops off with the introduction of the cutouts at between at approximately 175 mm along the longitudinal axis of the plunger.

The reduced bending stiffness along the length of the plunger may be configured to induce flexibility in the plungers as contemplated by the present invention. As would be understood by those of skill in the art, the cutouts may be sized and positioned to reduce the moment of inertia of the plunger, reducing the bending stiffness about the X and Y axes of the plunger. As shown in the FIG. 3G, the bending stiffnesses about the X and Y axes of the plunger at the top end, the end without the cutouts, are approximately the same as those of the traditional plunger. However, with the cutouts, the flexible plunger includes an approximate minimum bending stiffness about the X axis of $0.808\times10^6$/Young's Modulus and an approximate minimum bending stiffness about the Y axis of $2.61\times10^6$/Young's Modulus.

According to the embodiment of the present invention shown in the graph of FIG. 3G, the bending stiffness of the plunger about both axes may be reduced by about half. As shown in the graph, the bending stiffness of the plunger about the X axis at the end including the cutout or opening (the left side of the graph in FIG. 3G) is shown as approximately half of the bending stiffness of the plunger about the X axis at the end without the cutout (the right side of the graph in FIG. 3G). Likewise, the bending stiffness of the plunger about the Y axis at the end including the cutout or opening (the left side of the graph in FIG. 3G) is shown as approximately half of the bending stiffness of the plunger about the Y axis at the end without the cutout (the right side of the graph in FIG. 3G).

Figure 3H:
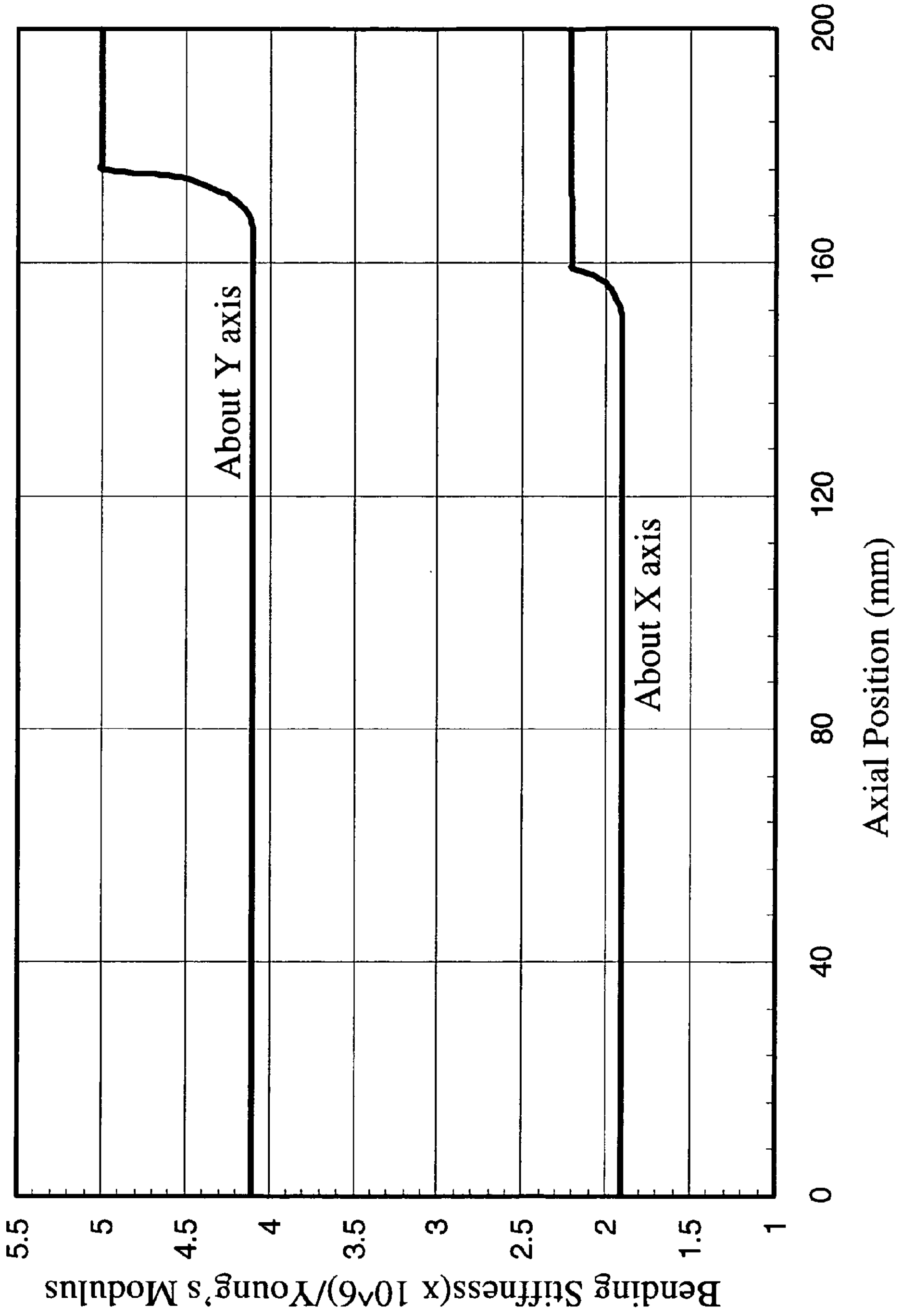
FIG. 3H illustrates another graph of bending stiffness associated with a flexible plunger in accordance with another embodiment of the present invention.

FIG. 3H shows a graph of the axial variation of the bending stiffness according to another embodiment of the flexible plunger configured with cutouts removed from the plunger, generally as shown in FIGS. 3A-F. The flexible plunger used to generate the graph of FIG. 3H includes a hollow tube, having a length of approximately 200 mm, a width of approximately 5 inches, a depth of approximately 3 inches, a wall thickness of approximately ¼ inch, and four cutouts. The cutouts on the 5-inch faces are approximately 0.75 inch wide, approximately 160 mm long from one end, and centered on the face of the flexible plunger. The cutouts on the 3-inch faces are approximately 0.75 inch wide, approximately 175 mm long from one end, and centered on the face of the flexible plunger. As shown in the graph of FIG. 3H, the bending stiffness/young's modulus is plotted along the vertical axis of the graph and the axial position on the plunger is plotted along the horizontal axis of the graph. As shown, the bending stiffness about the X and Y axes drops off with the introduction of the cutouts at between about 180 mm to about 160 mm along the longitudinal axis of the plunger.

The reduced bending stiffness along the length of the plunger, from the end of the plunger to approximately 140 mm, may be configured to induce flexibility in the plungers as contemplated by the present invention. As would be understood by those of skill in the art, the cutouts may be sized and positioned to reduce the moment of inertia of the plunger, reducing the bending stiffness about the X and Y axes of the plunger. As shown in the FIG. 3H, the bending stiffnesses about the X and Y axes of the plunger at the top end, the end without the cutouts, are approximately the same as those of the traditional plunger. However, with the cutouts, the flexible plunger includes a minimum bending stiffness about the X axis of $1.90\times10^6$/Young's Modulus and a minimum bending stiffness about the Y axis of $4.10\times10^6$/Young's Modulus.

As would be apparent to one of ordinary skill in the art, the graphs of bending stiffness in FIGS. 1G, 3G, and 3H are normalized per Young's Modulus such that the figures may be used to calculate the bending stiffness for the plunger regardless of the material used to fabricate the plungers as shown and described in accordance with the present invention. Although, A-36 mild steel is a typical steel used in the fabrication of plungers, it should be understood that other steels and materials, such as wood, composites, plastics, alloys, etc, may be used in the fabrication of plungers without deviating from the scope and spirit of the present invention.

The results of the increased flexibility of plunger according to the present invention are also shown in FIGS. 4-9. FIGS. 4-9 illustrates the results of the vibration simulations with the same technical arrangement and procedure as used for tests on conventional plungers as shown in FIG. 2. However, FIGS. 4-9 illustrate vibration test results of different embodiments of the present invention in which the plungers are modified to induce flexibility and dampening.

Figure 4:
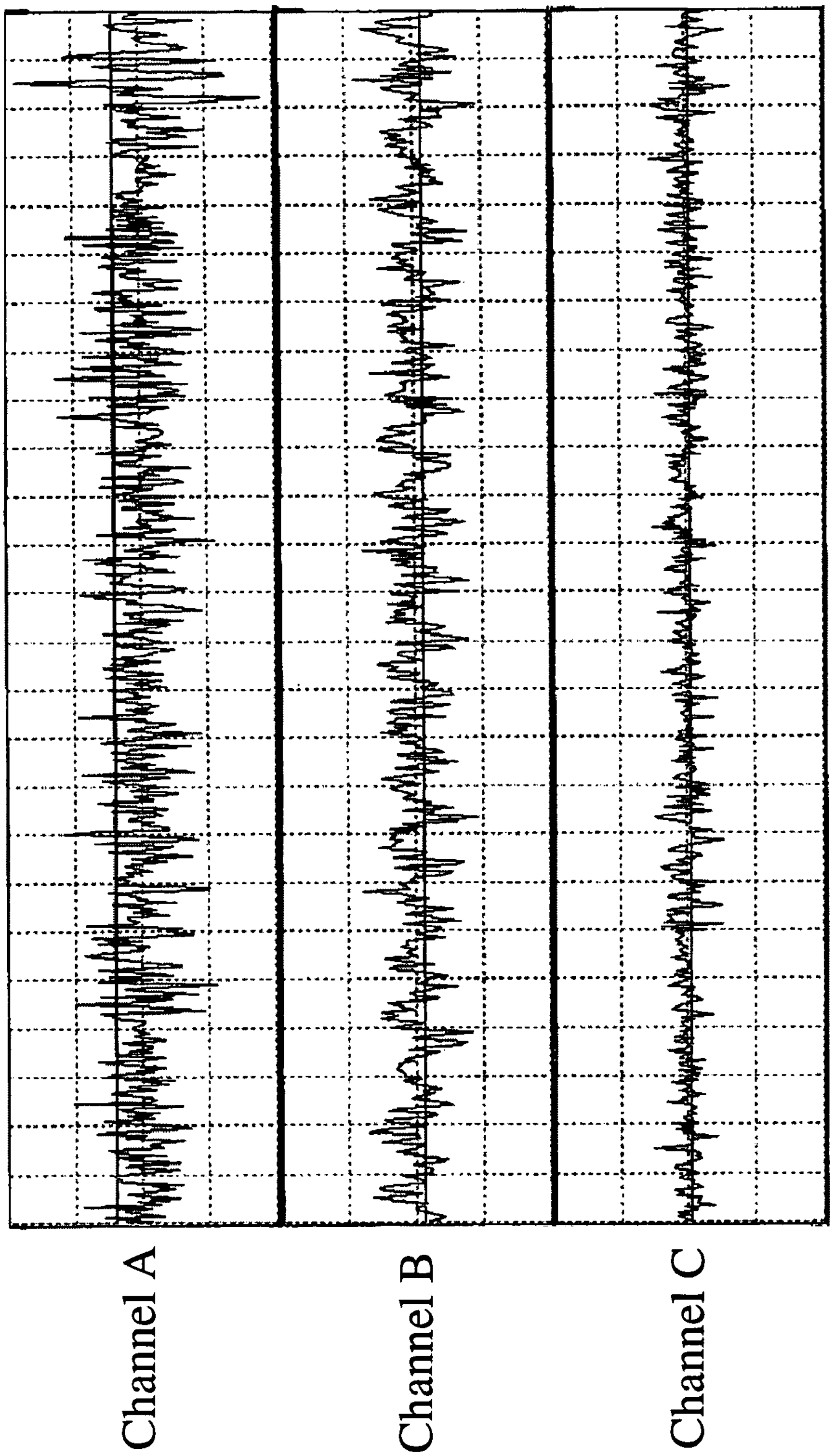
FIG. 4 illustrates vibrational test data associated with a flexible plunger in accordance with another embodiment.

In FIG. 4, vibration test results are shown for an embodiment of the flexible plunger including a 2"×4" tube, as used in the prior art plunger, annealed at 1100 degrees for four hours. In comparison to FIG. 2 and the prior art plunger, the annealed tube is shown to dampen the transmission of vibrations. As seen on channel B and more specifically on channel C of FIG. 4, the reduced vibrations indicate that the annealed flexible plunger reduces the amount of forces transmitted from the vibrator, through the plunger, and to the head structure.

Figure 5:
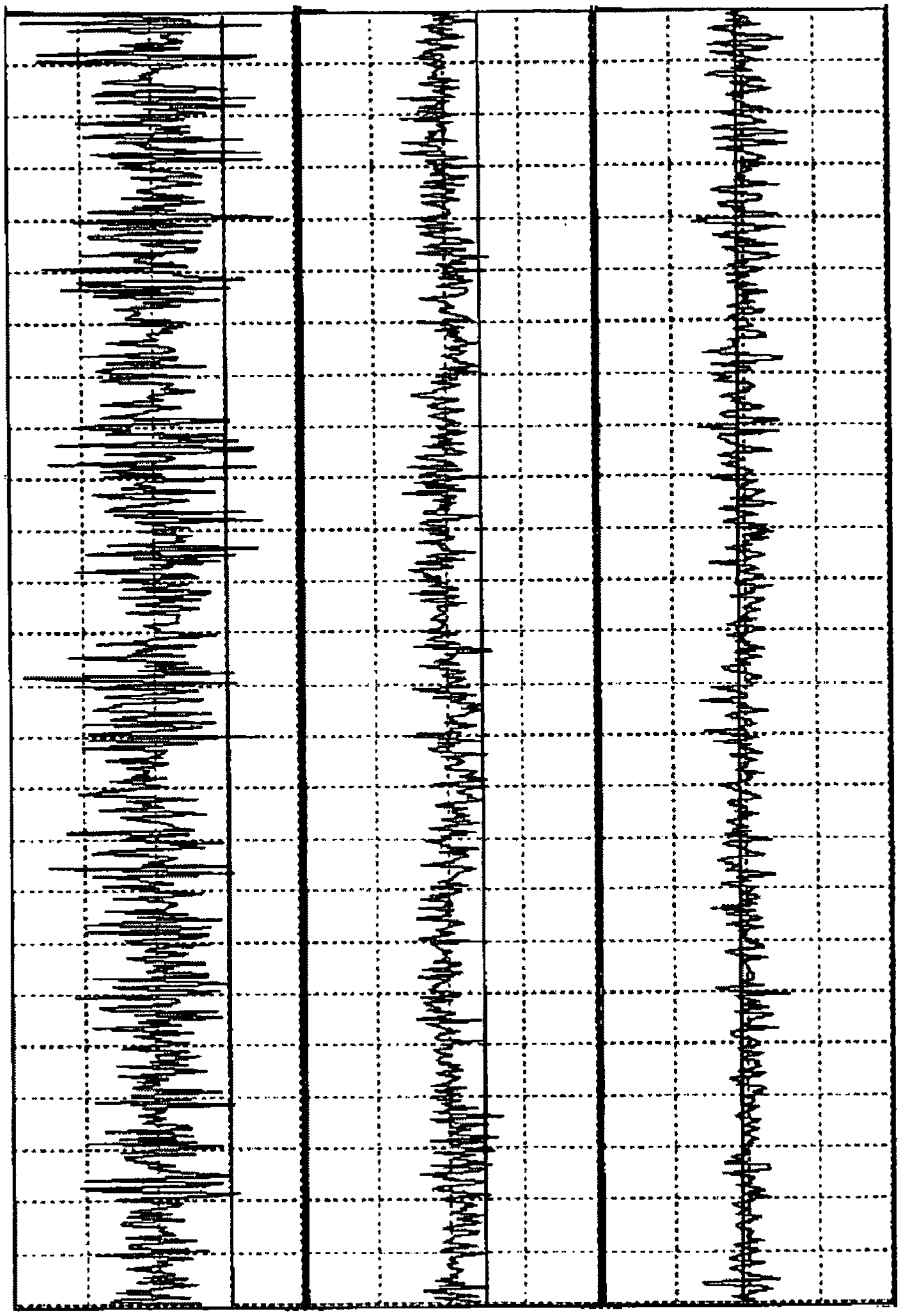
FIG. 5 illustrates vibrational test data associated with a flexible plunger in accordance with another embodiment.

In FIG. 5, vibration test results are shown for an embodiment of the flexible plunger including a 2"×4" tube, as used in the prior art plunger, with a length of 250 mm. The flexible plunger includes 3 mm wide vertical slits removed from the center of all four sides of the tube (refer to FIGS. 11A-C). In comparison to FIG. 2 and the prior art plunger, the flexible plunger of FIG. 5 is shown to dampen the transmission of vibrations as seen on channel B and again, more specifically on channel C. The reduced vibrations on channel C indicate that this flexible plunger reduces the amount of forces transmitted from the vibrator, through the plunger, and to the head structure.

Figure 6:
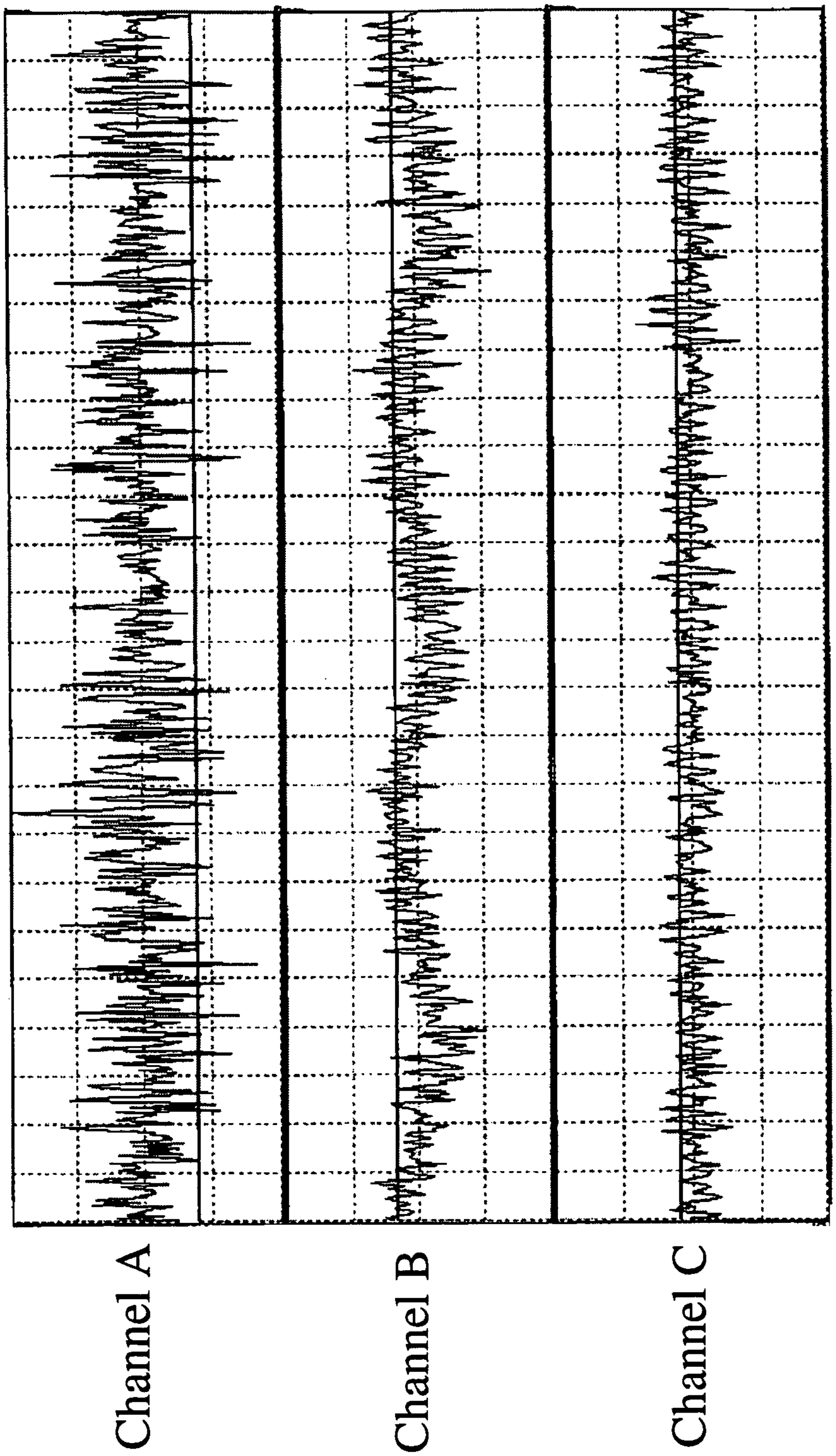
FIG. 6 illustrates vibrational test data associated with a flexible plunger in accordance with another embodiment.

In FIG. 6, vibration test results are shown for an embodiment of the flexible plunger including a 2"×4" tube, as used in the prior art plunger, with a length of 250 mm. The plunger includes centered slits removed from each side such that 20 mm wide walls remain adjacent to each corner (refer to FIGS. 12A-C). In comparison to FIG. 2 and the prior art plunger, the flexible plunger of FIG. 6 is shown to dampen the transmission of vibrations as seen on channel B and again, more specifically on channel C. The reduced vibrations on channel C indicate that this flexible plunger reduces the amount of forces transmitted from the vibrator, through the plunger, and to the head structure.

Figure 7:
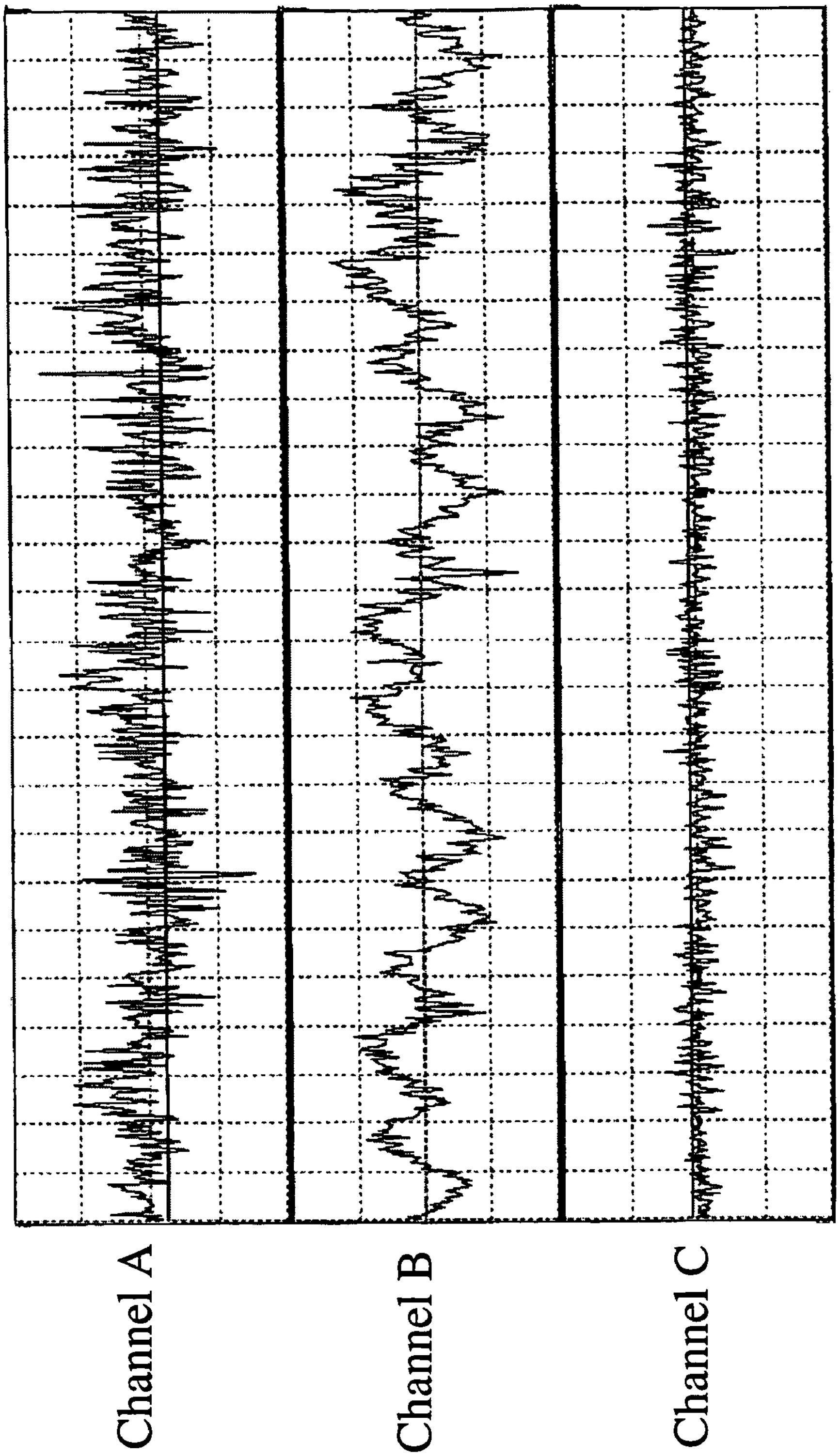
FIG. 7 illustrates vibrational test data associated with a flexible plunger in accordance with another embodiment.

In FIG. 7, vibration test results are shown for an embodiment of the flexible plunger including a 2"×4" tube, as used in the prior art plunger, with a length of 250 mm. The plunger includes 50 mm slits removed from the 4" sides of the plunger and 3 mm slits removed from the 2" sides of the plunger (refer to FIGS. 10A-C). In comparison to FIG. 2 and the prior art plunger, the flexible plunger of FIG. 7 is shown to dampen the transmission of vibrations as seen on channel B and again, more specifically on channel C. The reduced vibrations on channel C indicate that this flexible plunger reduces the amount of forces transmitted from the vibrator, through the plunger, and to the head structure.

Figure 8:
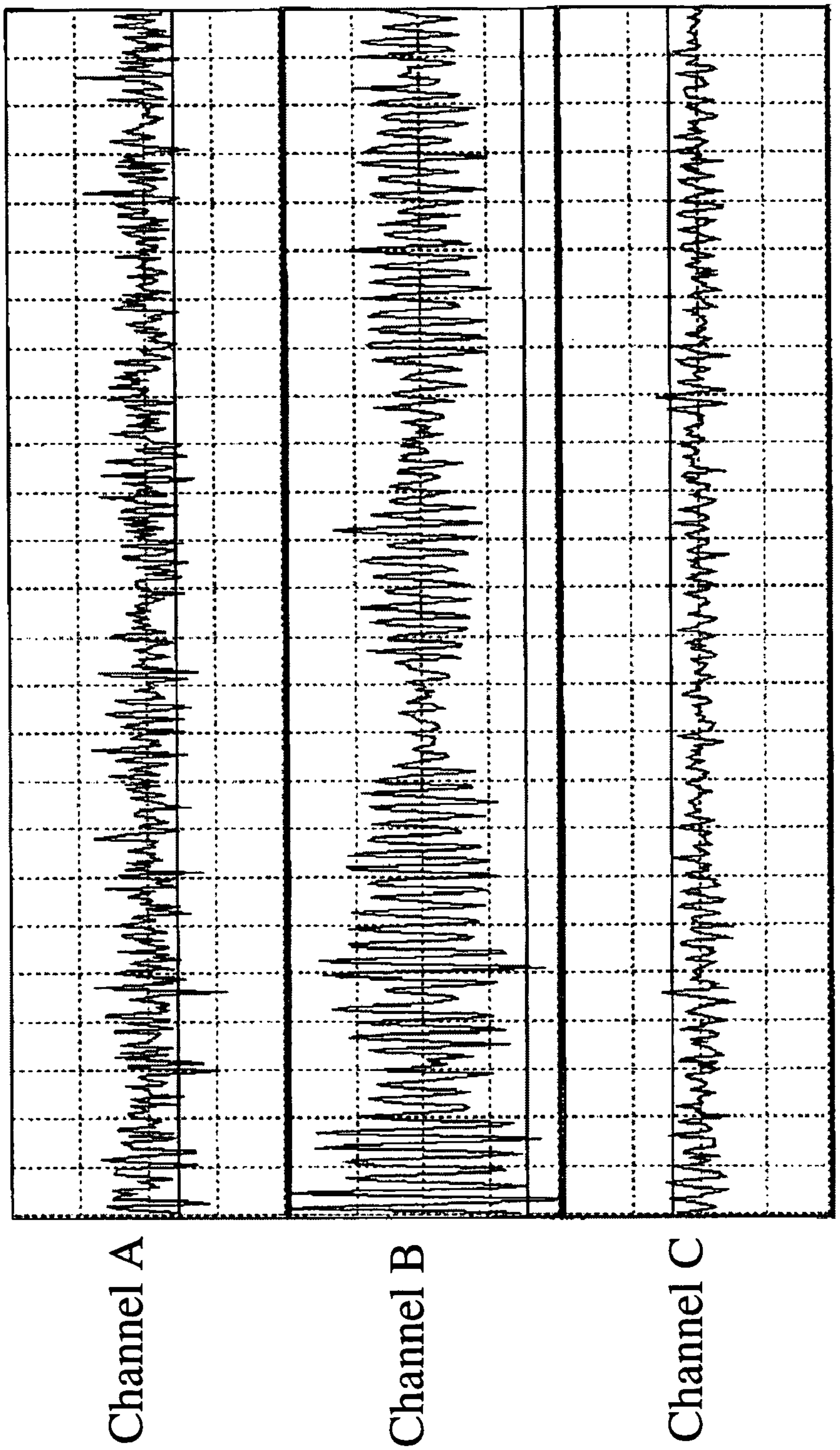
FIG. 8 illustrates vibrational test data associated with a flexible plunger in accordance with another embodiment.

In FIG. 8, vibration test results are shown for an embodiment of the flexible plunger including a 2"×4" tube, as used in the prior art plunger, with a length of 250 mm. The plunger includes two opposite corners removed (refer to FIGS. 13A-C) such that 20 mm is removed from each of the four sides of the tube. In comparison to FIG. 2 and the prior art plunger, the flexible plunger of FIG. 8 failed to significantly dampen the vibrations recorded on channel B. However, this plunger still dampened the vibrations seen on channel C. The reduced vibrations on channel C indicate that this flexible plunger also reduces the amount of forces transmitted from the vibrator, through the plunger, and to the head structure.

Figure 9:
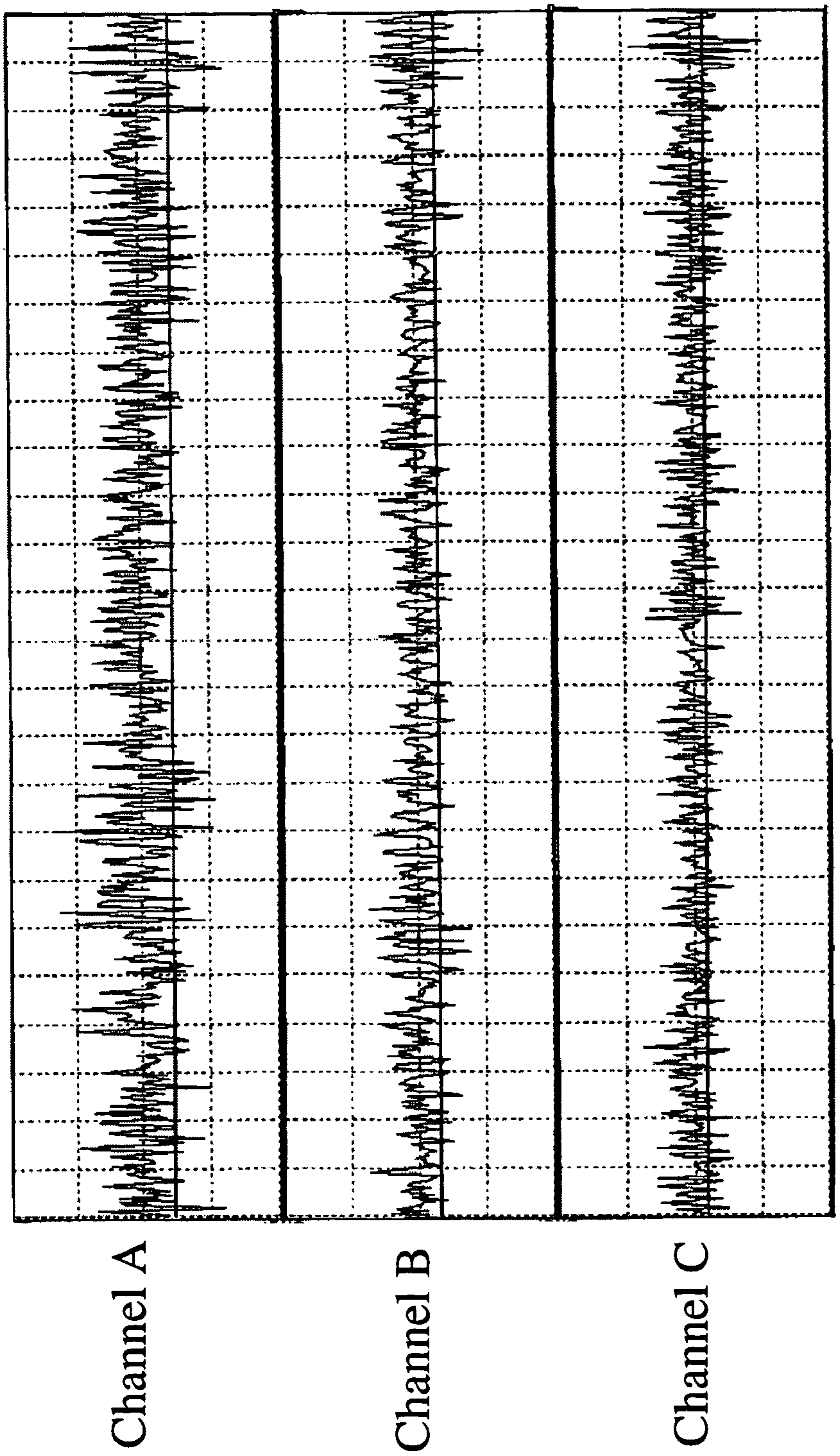
FIG. 9 illustrates vibrational test data associated with a flexible plunger in accordance with another embodiment.

In FIG. 9, vibration test results are shown for an embodiment of the flexible plunger including a 2"×4" tube, as used in the prior art plunger, with a length of 250 mm. The plunger includes all four corners removed (refer to FIGS. 14A-C) such that each of the four sides of the tube has 20 mm is removed from both edges. In comparison to FIG. 2 and the prior art plunger, the flexible plunger of FIG. 9 is shown to dampen the transmission of vibrations as seen on channel B and again, more specifically on channel C. The reduced vibrations on channel C indicate that this flexible plunger reduces the amount of forces transmitted from the vibrator, through the plunger, and to the head structure.

The flexibility of plunger in the embodiments of the present invention not only dampen vibrations as shown in FIGS. 4-9, but may also prolong the usable life of the plunger and weld joints, resulting in fewer required replacements and loss of production time. For example, in tests performed under the testing conditions described in regards to FIGS. 4-10, failures for flexible plungers were postponed when compared to the 30-minute failure of the prior art plunger mentioned above.

A flexible plunger fabricated from a solid flat bar failed after about 5 hours under vibration load. This solid flat bar flexible plunger included a 2"×1" flat bar with a length of 160 mm and a weight of about 2 lbs. The flat bar was welded all around to the plates representing the head structure and the backing plate. The failure of the flat bar, after about 5 hours, occurred with a crack forming in the weld.

Another flexible plunger fabricated from a 2"×4" tube failed after about 2.5 hours. This flexible plunger included a 2"×4" tube with 65 mm cutouts on the center each side (refer to FIGS. 11A-C) to induce flexibility. This flexible plunger included a length of 160 mm and a weight of about 2 lbs. The failure, after about 2.5 hours, occurred with a crack developing in one of the cutouts.

Another flexible plunger fabricated from a 2"×4" tube failed after about 100 hours. This flexible plunger included a 2"×4" tube with 45 mm cutouts on the center of each side (refer to FIGS. 11A-C) to induce flexibility. This flexible plunger included a length of 250 mm and a weight of about 3.5 lbs. The failure of the 45 mm plunger, after about 100 hours, occurred with a crack developing in one of the cutouts.

Although the present invention has been described above with reference to embodiments of flexible plungers and test data, other embodiments of the present invention may be fabricated with induced flexibility. In FIGS. 10-14, examples of embodiments of the present invention are shown.

Figure 10A:
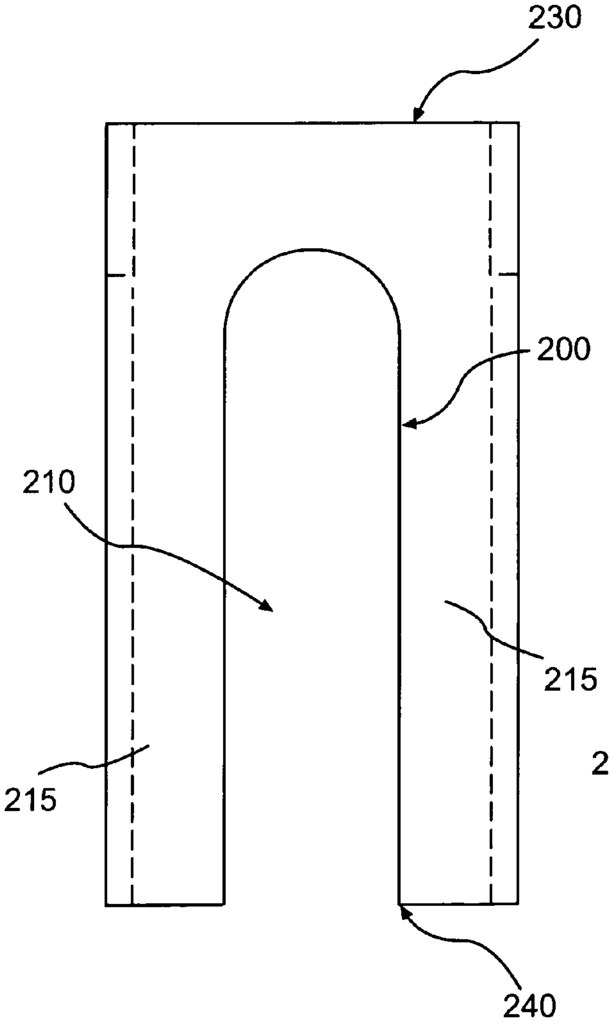
FIGS. 10A-C illustrate a flexible plunger in accordance with another embodiment.
Figure 10B:
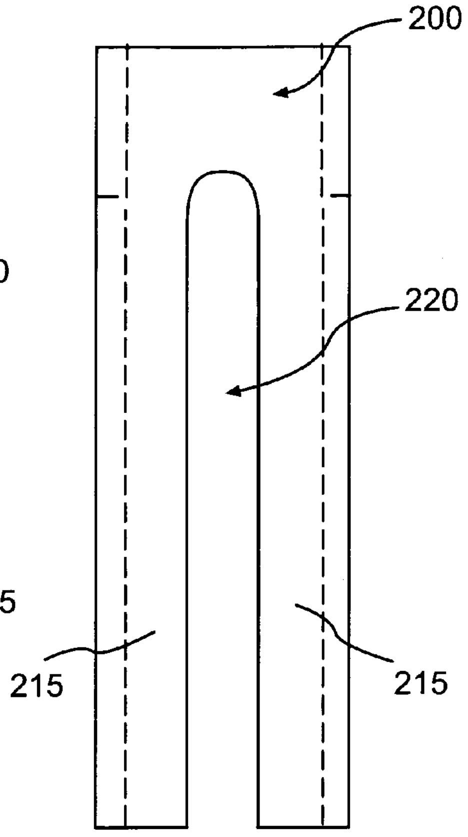
Figure 10C:
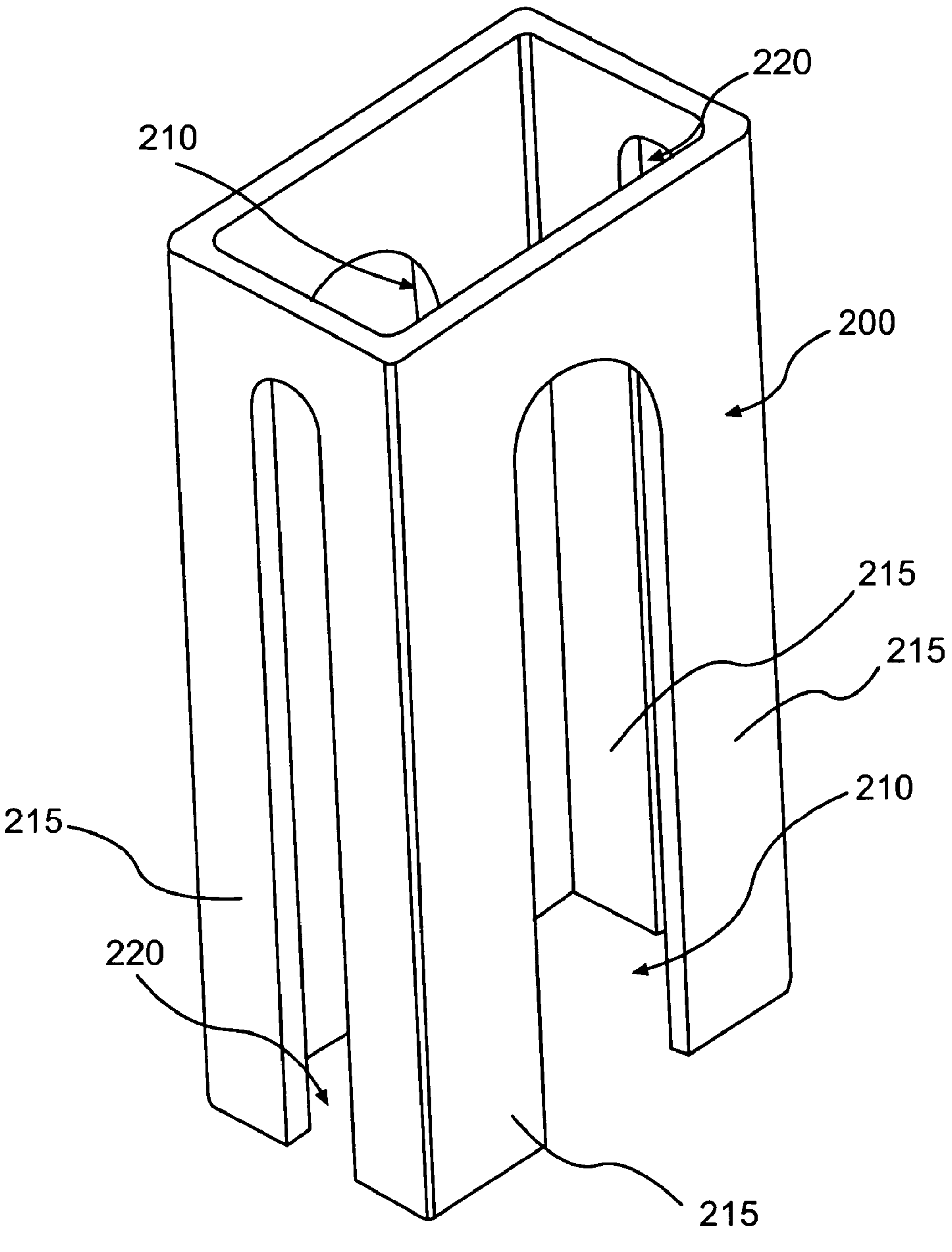

Referring now to FIGS. 10A-C, one embodiment of the present invention is shown. It should be noted that the flexible plunger 200, as shown in FIGS. 10A-C, is used in an exemplary manner in FIGS. 3A-F. The flexible plunger 200 comprises a tube of generally rectangular cross-section and includes cutouts 210 and 220 running the lengthwise direction of the flexible plunger 200. In FIG. 10A, cutout 210 is shown removed from two opposing sides of the flexible plunger. In FIG. 10B, cutout 220 is shown removed from the other two sides of the flexible plunger. A perspective view of flexible plunger 200 is shown in FIG. 10C with the corners running the length of the flexible plunger 200 and forming the legs 215.

In the embodiment shown in FIGS. 10A-C, the surface 230 of the flexible plunger 200 is fastened to the head structure 110 and the surface 240 is fastened to the backing plate 150. However, the flexible plunger 200 may be flipped such that surface 230 connects to the backing plate 150 without deviating from the scope and spirit of the present invention.

Although the embodiment of the present invention as shown in FIGS. 10A-C employs the flexible plunger 200 with a rectangular cross-section and cutouts 210 and 220, the flexible plunger may be implemented using other cross-sections and shapes such as tubes, angles, I-beam configurations, etc. In other embodiments, the plunger tubes may be of constant or varying cross-section and may include shapes such as circular, rectangular, triangular, etc. The flexible plunger may also be solid or hollow and include cutouts of other geometric shapes without deviating from the scope and spirit of the present invention. It is also contemplated that the flexible plunger 200 may be implemented in a non-rigid, flexible, and/or spring-like design or structure.

It should be understood that the flexibility of plungers may be increased by increasing the length of the plunger, contrary to the accepted prior art teachings of shortening the plunger length to increase strength and stiffness. It is contemplated that the flexibility of the plunger 200 as shown in FIGS. 10A-C may be adjusted by removing or adjusting the size of the cutouts 210 and 220 and also by modifying the length of plunger.

Prior art or existing plungers may also be converted or modified to flexible plungers and implemented as shown in FIGS. 3A-F by removing mass or cutouts from the existing plungers to induce flexibility.

FIGS. 10A-C illustrate a plunger design with cutouts of different sizes: cutout 210 is larger than the cutout 220 as shown in FIGS. 10A-C. The width of the cutouts 210 and 220 in plunger 200 are relative to the length of sides of the plunger. In FIGS. 10A-C, the ratio of the width of the cutout to the width of the side of the plunger is the same for both cutouts 210 and 220. However, it should be understood that the ratios may be different without deviating from the scope and spirit of the present invention. It is also contemplated that the cutouts on each side of the plunger may be different or that some sides may have cutouts where others do not. Additionally it is contemplated that the cutouts or openings may not necessarily extend to the end of the plunger and may be simply be multiple holes in the walls of the plunger. The number of cutouts or openings may also be varied.

Figure 11A:
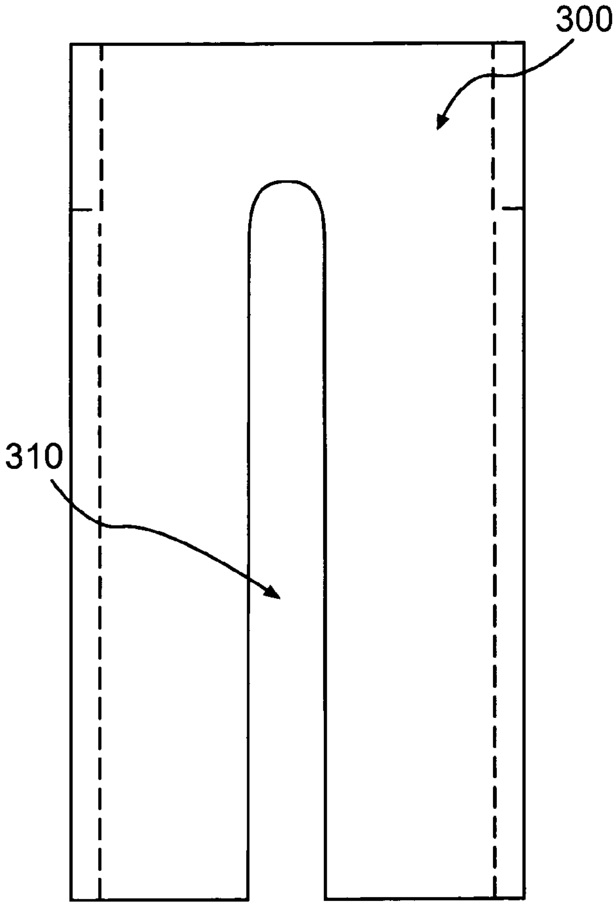
FIGS. 11A-C illustrate a flexible plunger in accordance with another embodiment.
Figure 11B:
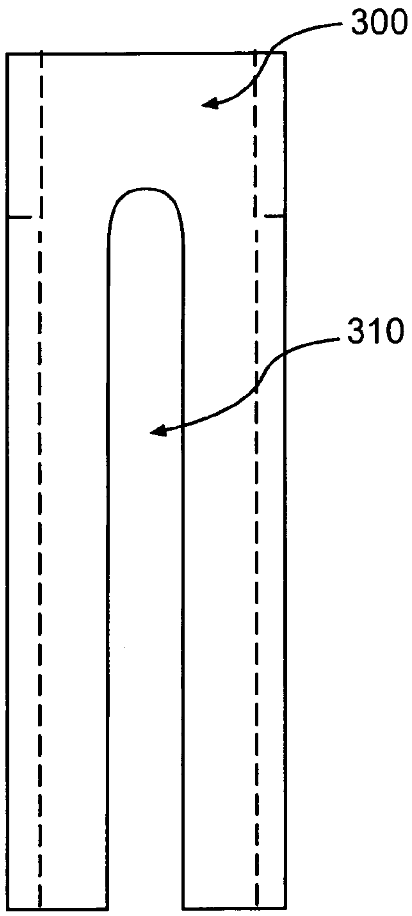
Figure 11C:
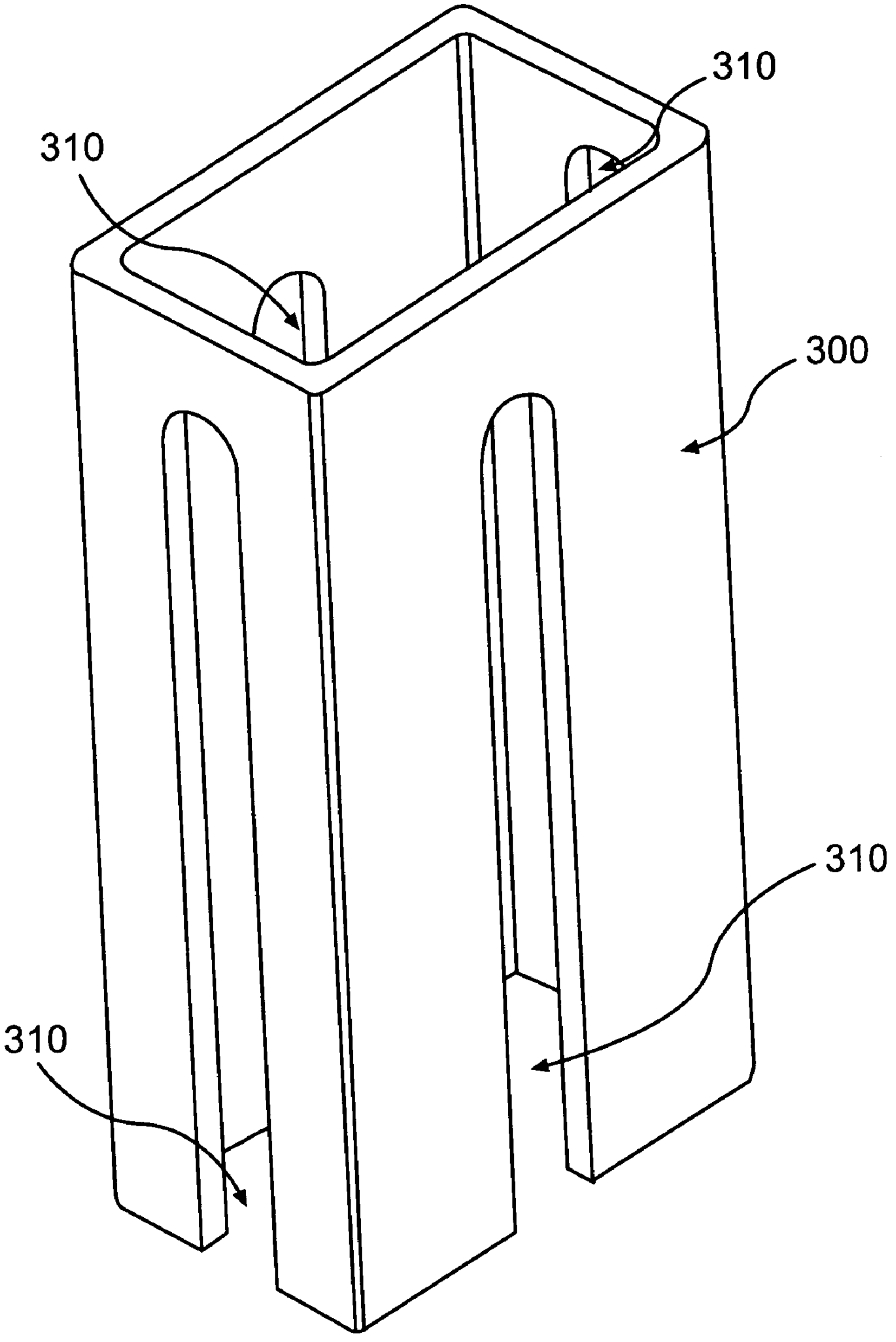

In FIGS. 11A-C, another embodiment of the present invention is shown as flexible plunger 300. Flexible plunger 300 includes equally sized cutouts 310 in the center of each side of the flexible plunger 300. It is contemplated that the size of the cutout 310 may be adjusted to achieve the desired flexibility and dampening needed to achieve prolonged component life.

Figure 12A:
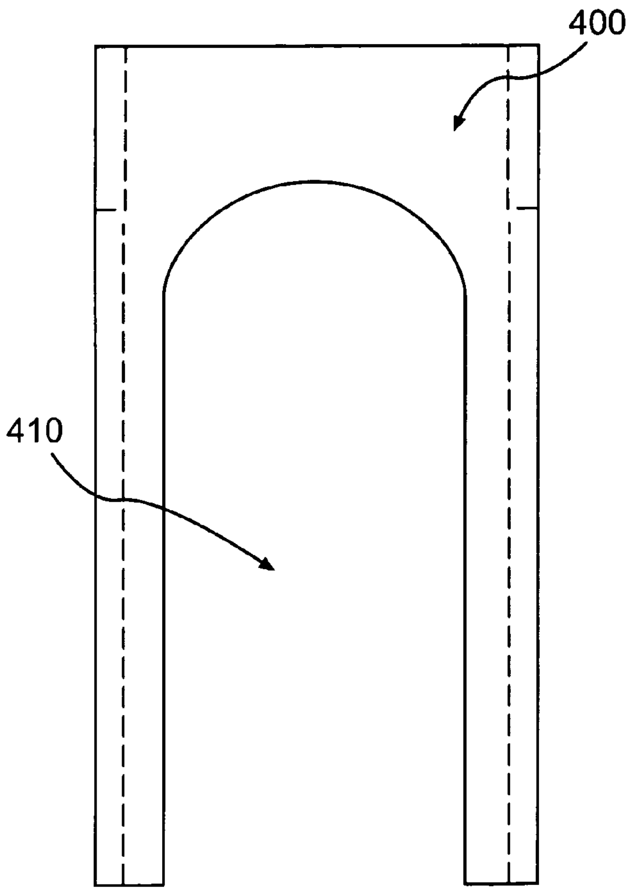
FIGS. 12A-C illustrate a flexible plunger in accordance with another embodiment.
Figure 12B:
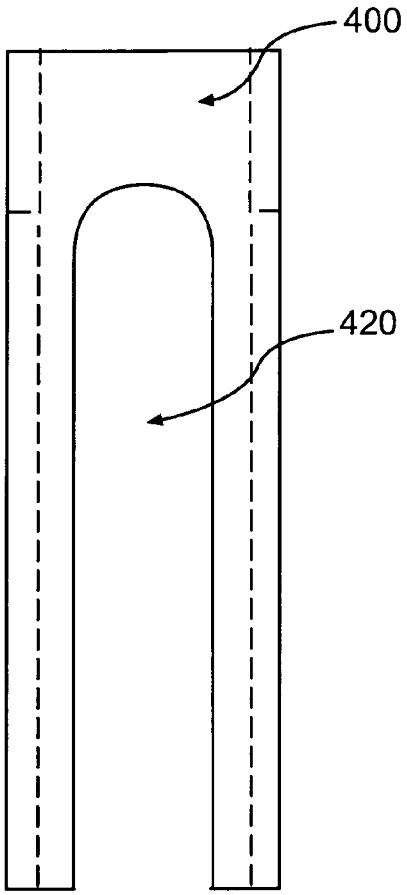
Figure 12C:
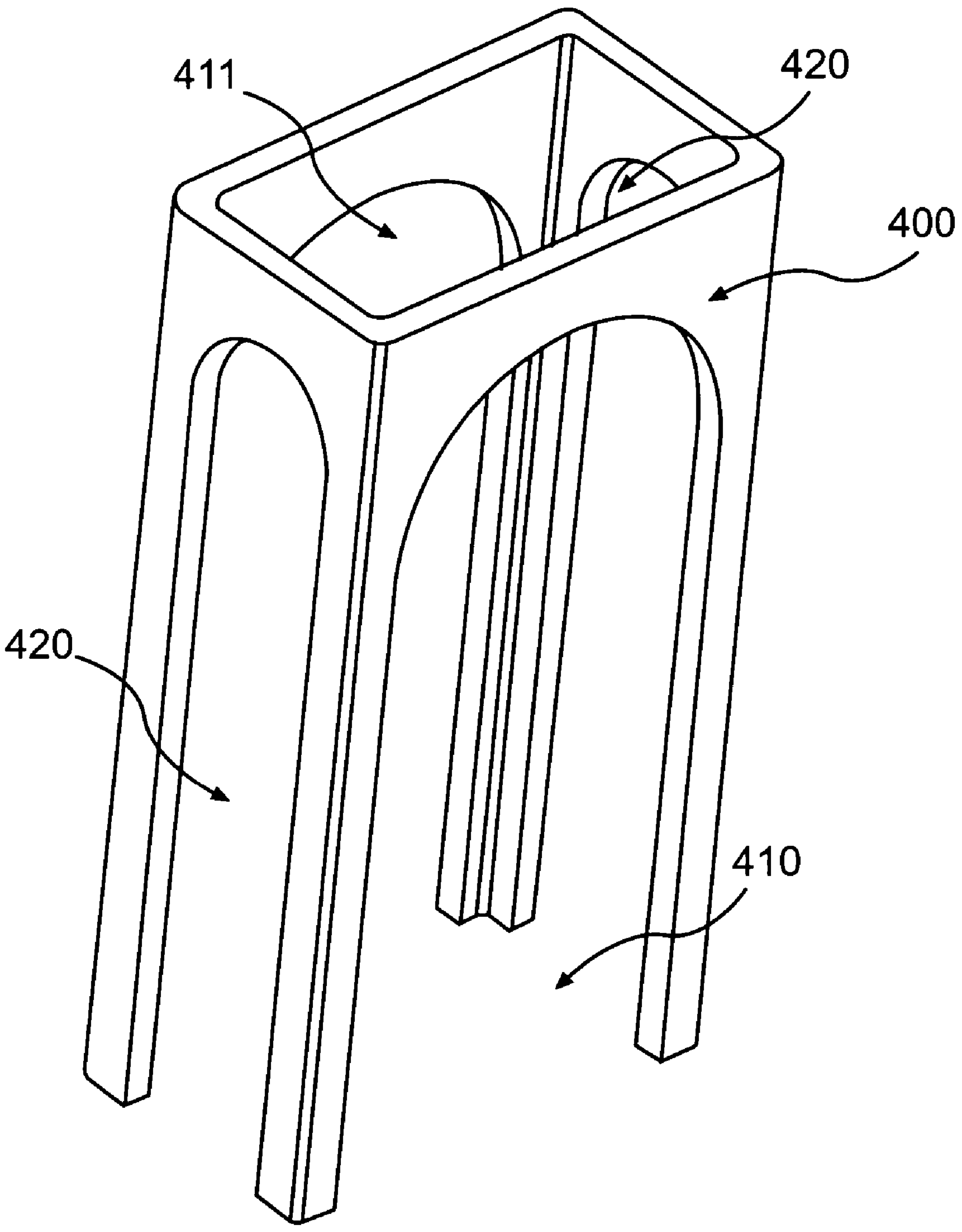

In FIGS. 12A-C, another embodiment of the present invention is shown as flexible plunger 400. Flexible plunger 400 includes cutouts 410 and 420 sized such that the remaining material of the plunger is the same for each side. This geometry creates equally sized columns located at the four corners as shown in FIG. 12C. Again, the size of the columns may be adjusted by varying the size of cutouts 410 and 420, thereby modifying the desired flexibility or dampening in other embodiments.

Figure 13A:
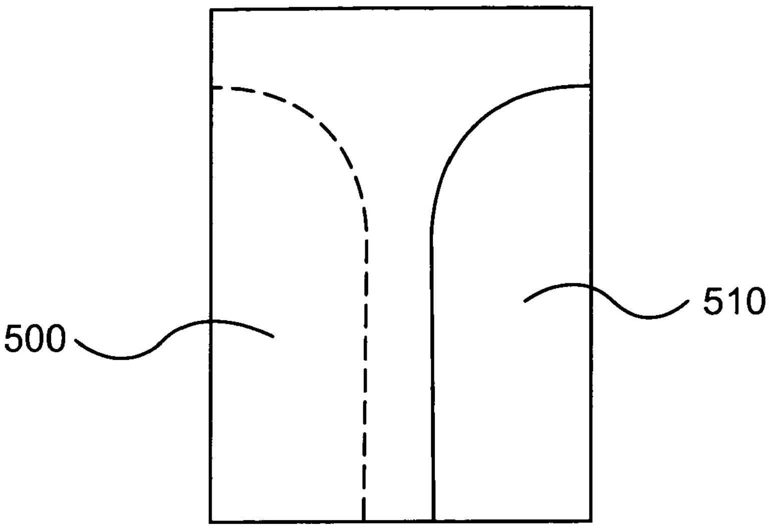
FIGS. 13A-C illustrate a flexible plunger in accordance with another embodiment.
Figure 13B:
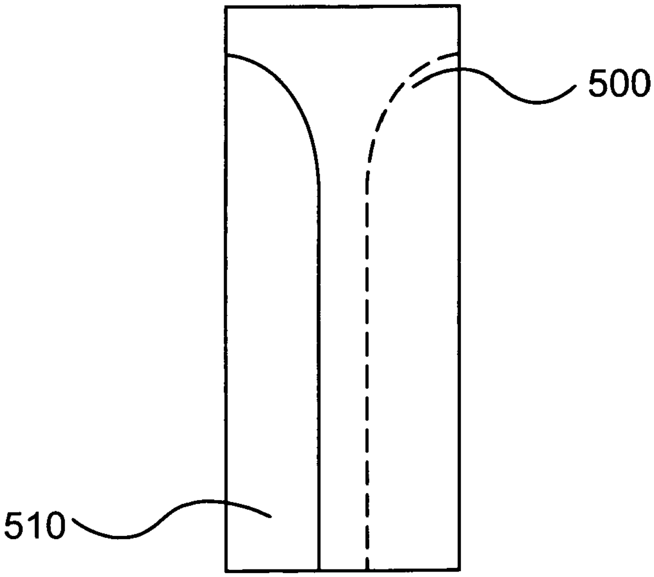
Figure 13C:
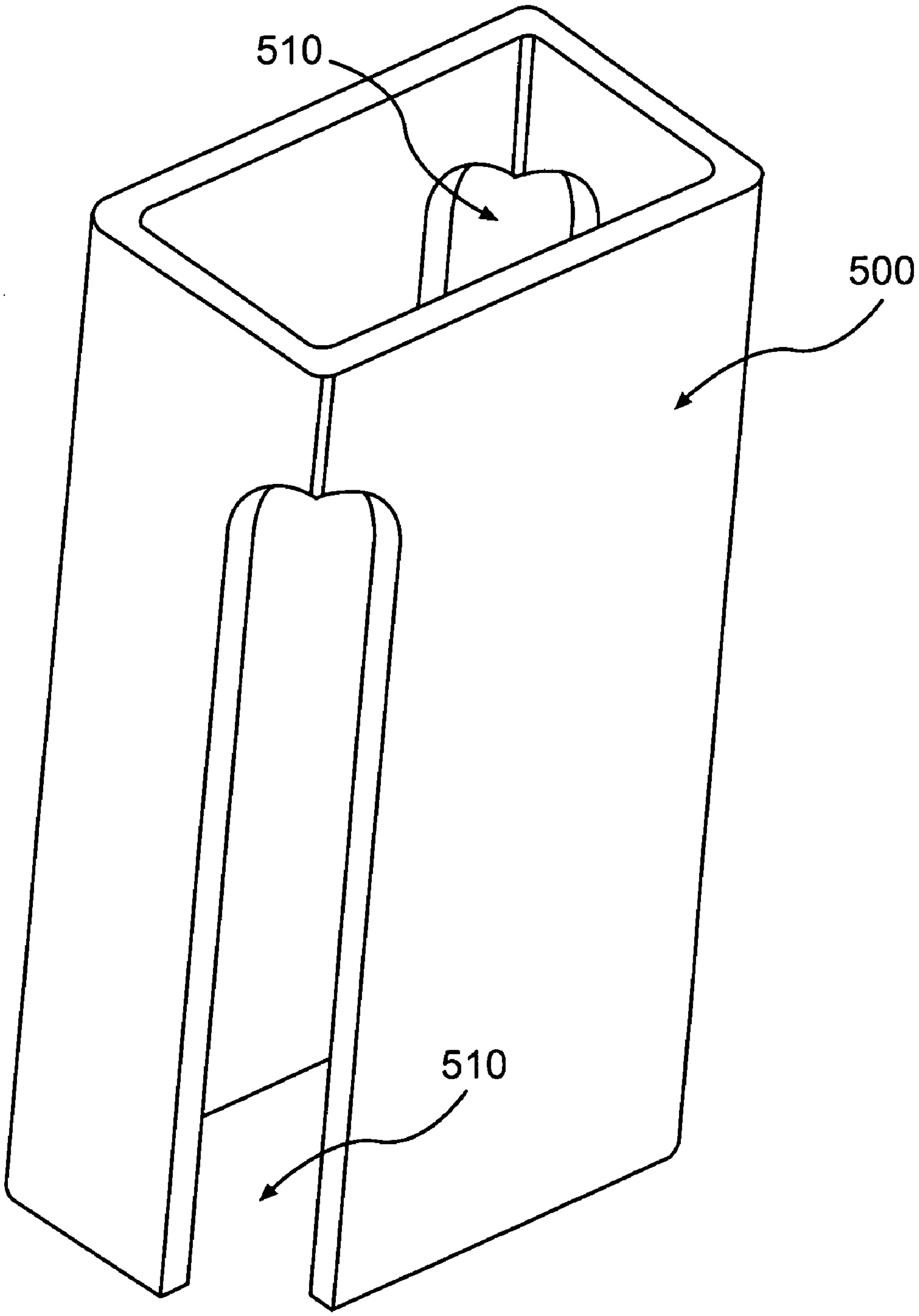

In FIGS. 13A-C, another embodiment of the present invention is shown as flexible plunger 500. Flexible plunger 500 includes cutouts 510, removing opposite corners of the flexible plunger 500 as shown in FIG. 13C. Again the size of the cutout 510 may be adjusted to achieve a desired flexibility or dampening. Although the cutouts 510 of plunger 500 are shown equal in size, the cutouts in opposite corners may be of different sizes in other embodiments. It is also contemplated that two adjacent corners could be removed.

Figure 14A:
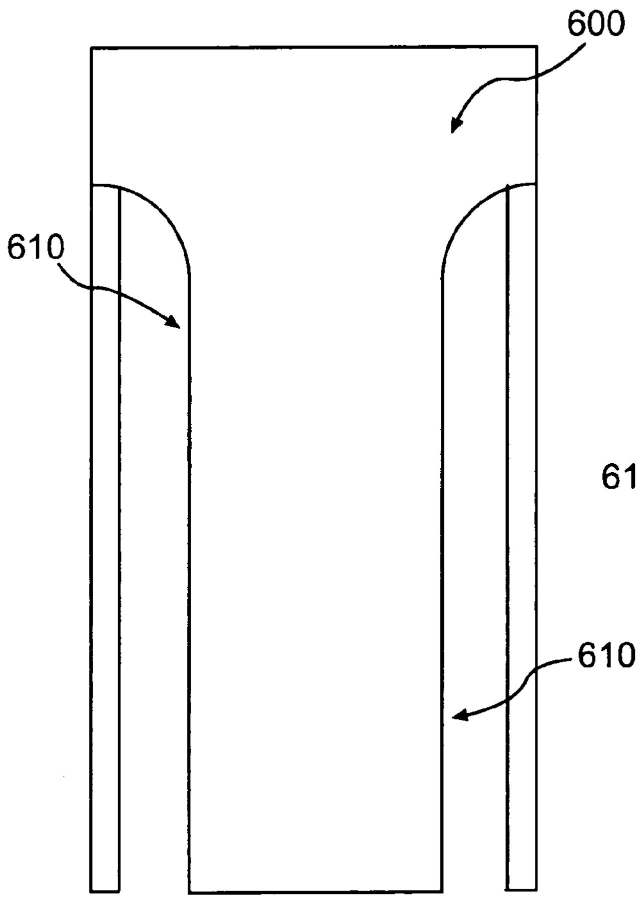
FIGS. 14A-C illustrate a flexible plunger in accordance with another embodiment.
Figure 14B:
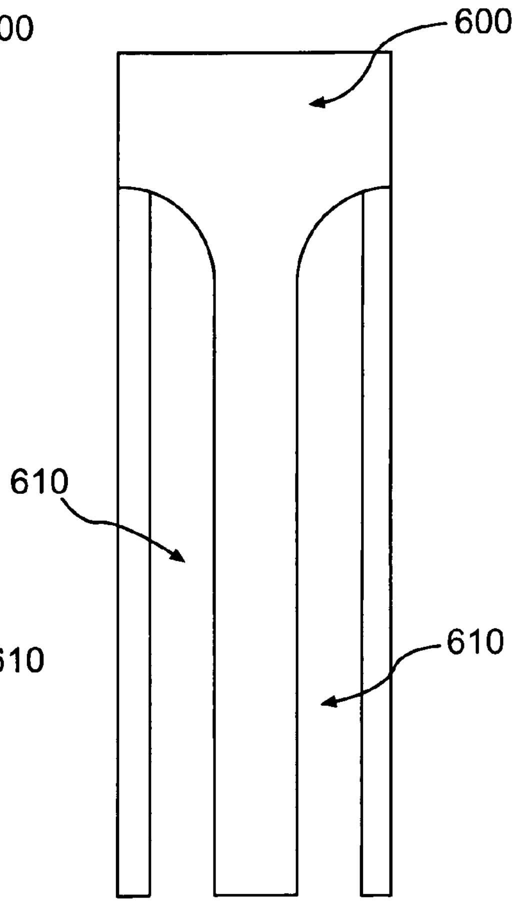
Figure 14C:
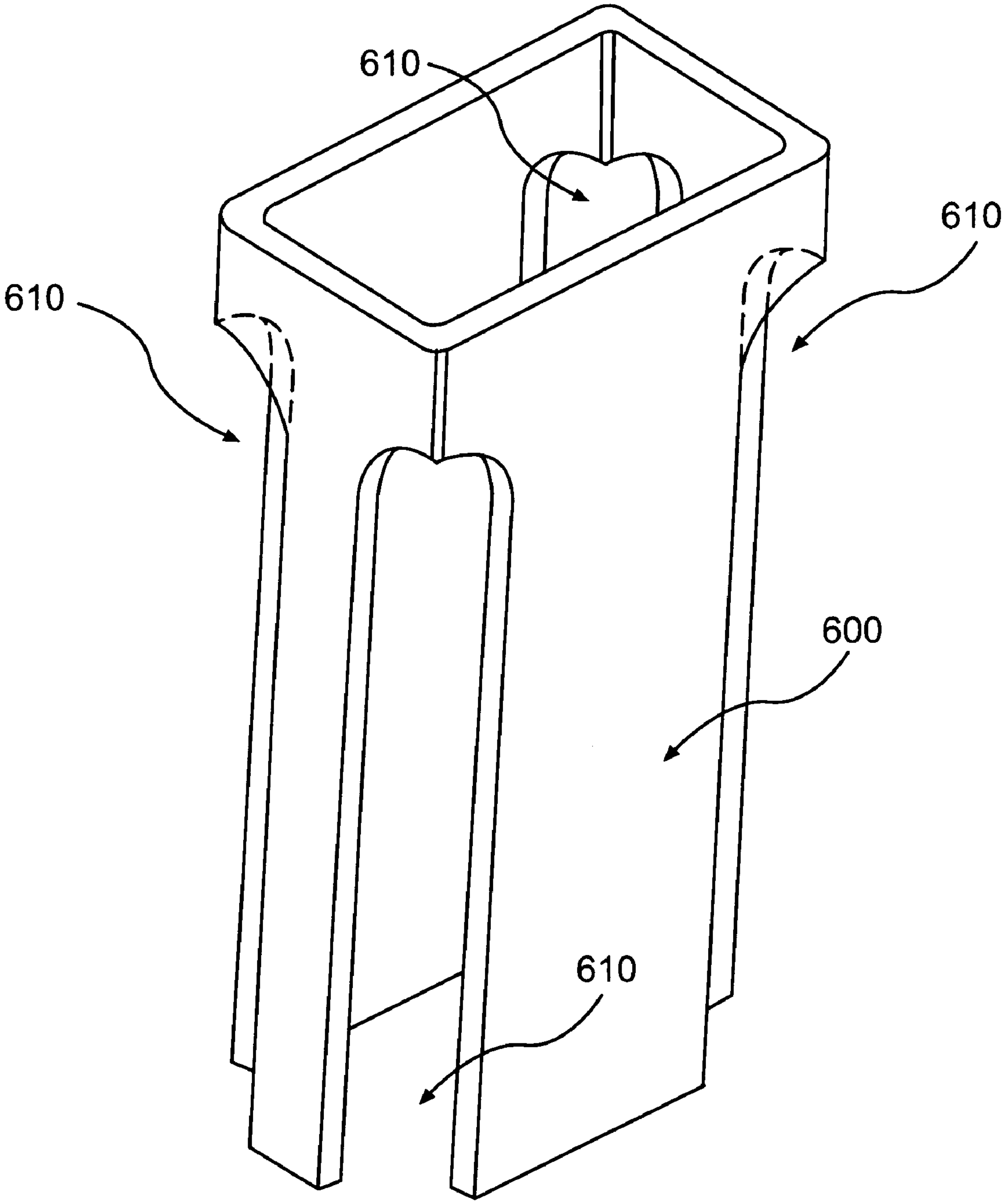

In FIGS. 14A-C, another embodiment of the present invention is shown as flexible plunger 600. Flexible plunger 600 includes a cutout 610 removing all four corners and creating four columns centered on each of the four sides of the flexible plunger 600 as shown in FIG. 14C. Although the cutouts in each corner are shown in equal size, the cutouts in the corners may be implemented in different sizes. Again, the size of the cutouts 610 may be adjusted depending on the desired flexibility and dampening.

It should also be understood that the flexible plungers according to the present invention may be connected to the stripper shoes and the head structure in varying ways. For example, the flexible plunger may be flipped such that the solid end of the plunger is connected to the head structure or the stripper shoe without deviating from the scope and spirit of the present invention.

Other materials may be substituted for the typical steel or metal alloys used in prior art plungers. For example, plastics, composites, wood, rubber and/or urethane may be used as material for the plunger. It is also contemplated that non-isotropic materials may be employed to adjust and control the stiffness and flexibility along specific axes of a plunger. Further, a plunger may undergo mechanical, heat, and/or chemical treatment to increase or decrease flexibility. For example, a conventional plunger made from typical steel may be annealed at a given temperature for a period of time to induce a desired flexibility in the steel.

It should be noted that the flexible plungers may also be effective when other compaction techniques are used during compaction. For example, agitation may be used to compact concrete and improve surface quality during production. It is also contemplated that a combination of vibration and agitation may be used in combination with the flexible plungers.

It should be noted that although the cutouts detailed in the embodiments of the present invention are generally shown as symmetric in shape and placement, other shapes, both symmetric and non-symmetric, and other locations may be implemented to induce flexibility in a plunger without deviating from the scope and spirit of the present invention.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

The invention claimed is:

1. An assembly for stripping a medium from a mold cavity, the assembly comprising:

at least one stripper shoe;

a head structure; and at least one flexible plunger connecting the head structure and the at least one stripper shoe and having a first end and a second end and a longitudinal axis therebetween, the at least one flexible plunger further having a first direction substantially orthogonal to the longitudinal axis and a second direction substantially orthogonal to the longitudinal axis and the first direction;

a first bending stiffness of the at least one flexible plunger about the first direction and at the first end; and a second bending stiffness of the at least one flexible plunger about the first direction and at a position between the first end and the second end, wherein the second bending stiffness is substantially less than the first bending stiffness.

2. The assembly according to claim 1, wherein the at least one flexible plunger includes at least one cutout substantially responsible for the second bending stiffness being substantially less than the first bending stiffness.

3. The assembly according to claim 2, wherein the at least one flexible plunger includes a tube structure and a cross section having four sides and four corners.

4. The assembly according to claim 3, wherein the at least one cutout includes at least four cutouts such that at least one of the four cutouts encompasses a portion of each of the four sides.

5. The assembly according to claim 3, wherein the at least one cutout includes at least four cutouts such that at least one of the four cutouts encompasses a portion of each of the four corners.

6. The assembly according to claim 3, further comprising:

a third bending stiffness about the second direction and at the first end; and a fourth bending stiffness about the second direction and at the position between the first end and the second end, wherein the fourth bending stiffness is substantially less than the third bending stiffness.

7. The assembly according to claim 6, wherein the second bending stiffness is approximately half of the first bending stiffness and the fourth bending stiffness is approximately half of the third bending stiffness.

8. The assembly according to claim 2, wherein the first end attaches to the head structure and the second end attaches to the at least one stripper shoe.

9. The assembly according to claim 2, wherein the first end attaches to the at least one stripper shoe and the second end attaches to the head structure.

10. An assembly for stripping concrete from a mold, the assembly comprising:

at least one stripper shoe receivable in the mold;

a head structure; and at least one flexible plunger connecting the head structure to the at least one stripper shoe and configured from a hollow tube having a first end and a second end and a longitudinal axis therebetween, the hollow tube further having at least one opening at least partially between the first end and the second end, a first direction substantially orthogonal to the longitudinal axis and a second direction substantially orthogonal to the longitudinal axis and the first direction;

a first bending stiffness of the hollow tube about the first direction and at the first end; and a second bending stiffness of the hollow tube about the first direction and at the at least one opening, wherein the second bending stiffness is substantially less than the first bending stiffness.

11. The assembly according to claim 10, wherein the hollow tube includes a cross section having four sides and four corners.

12. The assembly according to claim 11, wherein the at least one opening includes four openings with each of the four sides of the hollow tube at least partially encompassed by one of the four openings.

13. The assembly according to claim 11, wherein the at least one opening includes four openings with each of the four corners of the hollow tube at least partially encompassed by one of the four openings.

14. The assembly according to claim 11, further comprising:

a third bending stiffness of the hollow tube about the second direction and at the first end; and a fourth bending stiffness located about the second direction and at the at least one opening, wherein the fourth bending stiffness is substantially less than the third bending stiffness.

15. The assembly according to claim 14, wherein the second bending stiffness is approximately half of the first bending stiffness and the fourth bending stiffness is approximately half of the third bending stiffness.

16. The assembly according to claim 10, wherein the first end attaches to the head structure and the second end attaches to the at least one stripper shoe.

17. The assembly according to claim 10, wherein the first end attaches to the at least one stripper shoe and the second end attaches to the head structure.

18. A method of increasing flexibility in an assembly for forming masonry units, the method comprising the steps of:

forming at least one plunger using a tubular structure having a first end and a second end and a longitudinal axis therebetween, the tubular structure having a wall, a first direction substantially orthogonal to the longitudinal axis and a first bending stiffness about the first direction and at the first end of the tubular structure;

forming at least one opening in the wall of the tubular structure at least partially between the first end and the second end, the at least one opening being responsible for a second bending stiffness about the first direction and at the at least one opening, the second bending stiffness being substantially less than the first bending stiffness;

connecting the at least one plunger to a head structure; and connecting the at least one plunger to a stripper shoe.

19. The method according to claim 18, wherein the tubular structure includes a second direction substantially orthogonal to the longitudinal axis and the first direction and a third bending stiffness about the second direction and at the first end of the tubular structure; and wherein the at least one opening being responsible for a fourth bending stiffness about the second direction and at the at least one opening, the fourth bending stiffness being substantially less than the third bending stiffness.

20. The method according to claim 19, wherein the second bending stiffness is approximately half of the first bending stiffness and the fourth bending stiffness is approximately half of the third bending stiffness.

* * * * *